US010007380B2

(12) United States Patent
Yoon et al.

(10) Patent No.: US 10,007,380 B2
(45) Date of Patent: Jun. 26, 2018

(54) TOUCH INPUT DEVICE WITH EDGE SUPPORT MEMBER

(71) Applicant: HiDeep Inc., Gyeonggi-do (KR)

(72) Inventors: Sangsic Yoon, Gyeonggi-do (KR);
Bonkee Kim, Gyeonggi-do (KR);
Seyeob Kim, Gyeonggi-do (KR);
Hojun Moon, Gyeonggi-do (KR);
Taehoon Kim, Gyeonggi-do (KR)

(73) Assignee: HIDEEP INC. (KR)

( * ) Notice: Subject to any disclaimer, the term of this patent is extended or adjusted under 35 U.S.C. 154(b) by 0 days. days.

(21) Appl. No.: 15/348,139

(22) Filed: Nov. 10, 2016

(65) Prior Publication Data
US 2017/0060329 A1    Mar. 2, 2017

Related U.S. Application Data

(63) Continuation-in-part of application No. 14/745,514, filed on Jun. 22, 2015, and a continuation-in-part of
(Continued)

(30) Foreign Application Priority Data

Jul. 29, 2013 (KR) ........................ 10-2013-0089516
Aug. 1, 2014 (KR) ........................ 10-2014-0098917

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC .... G06F 3/0416; G06F 3/0412; G06F 3/0414; G06F 3/044
See application file for complete search history.

(56) References Cited

U.S. PATENT DOCUMENTS

| 5,510,813 A | 4/1996 | Makinwa et al. |
| 2003/0007238 A1 | 1/2003 | Liang et al. |
(Continued)

FOREIGN PATENT DOCUMENTS

| CN | 103221911 | 7/2013 |
| CN | 103257779 | 8/2013 |
(Continued)

OTHER PUBLICATIONS

International Search Report for Corresponding Application No. PCT/KR2014/006907, dated Nov. 28, 2014.
(Continued)

*Primary Examiner* — Lisa Landis
(74) *Attorney, Agent, or Firm* — The Belles Group, P.C.

(57) ABSTRACT

In one embodiment, a touch input device includes a first electrode; a second electrode located on one side of the first electrode; a display disposed on one side of the first electrode opposite to the second electrode; and a spacer layer between the first electrode and the second electrode. One of the first electrode and the second electrode is a drive electrode, and the other is a receiving electrode that receives the drive signal by a mutual capacitance between the first electrode and the second electrode. When an external pressure is applied to the first electrode through the display, the first electrode is concavely bent toward the second electrode. The mutual capacitance between the electrodes changes according to a distance between the electrodes. The magnitude of the external pressure according to the change of the capacitance between the electrodes is detected.

29 Claims, 22 Drawing Sheets

Related U.S. Application Data application No. 14/908,706, filed as application No. PCT/KR2014/006907 on Jul. 29, 2014.

(52) U.S. Cl.
CPC .. *G06F 3/0414* (2013.01); *G06F 2203/04105* (2013.01); *G06F 2203/04107* (2013.01)

(56) References Cited

U.S. PATENT DOCUMENTS

| | | | |
|---|---|---|---|
| 2004/0227736 A1 | 11/2004 | Kamrath et al. | |
| 2007/0030255 A1 | 2/2007 | Pak et al. | |
| 2008/0062139 A1 | 3/2008 | Hotelling et al. | |
| 2008/0062140 A1 | 3/2008 | Hotelling et al. | |
| 2008/0202251 A1 | 8/2008 | Serban et al. | |
| 2009/0135161 A1* | 5/2009 | Endo | G06F 1/1626 345/174 |
| 2010/0024573 A1 | 2/2010 | Daverman et al. | |
| 2010/0033354 A1 | 2/2010 | Ejlersen | |
| 2010/0123672 A1 | 5/2010 | Kim et al. | |
| 2010/0309030 A1 | 12/2010 | Huang et al. | |
| 2010/0321609 A1 | 12/2010 | Qi et al. | |
| 2011/0023631 A1 | 2/2011 | Sleeman | |
| 2011/0037726 A1 | 2/2011 | Lee | |
| 2011/0115738 A1 | 5/2011 | Suzuki et al. | |
| 2011/0126900 A1 | 6/2011 | Inoue et al. | |
| 2011/0157087 A1 | 6/2011 | Kanehira et al. | |
| 2011/0175845 A1 | 7/2011 | Honda et al. | |
| 2011/0298479 A1 | 12/2011 | Matsushima | |
| 2012/0038583 A1 | 2/2012 | Westhues et al. | |
| 2012/0050195 A1 | 3/2012 | Heo et al. | |
| 2012/0068965 A1 | 3/2012 | Wada et al. | |
| 2012/0105340 A1 | 5/2012 | Beom et al. | |
| 2012/0113361 A1 | 5/2012 | Huang et al. | |
| 2012/0127095 A1 | 5/2012 | Jun | |
| 2012/0180575 A1 | 7/2012 | Sakano et al. | |
| 2013/0016059 A1 | 1/2013 | Lowles et al. | |
| 2013/0016060 A1 | 1/2013 | Pereverzev et al. | |
| 2013/0033450 A1 | 2/2013 | Coulson et al. | |
| 2013/0234734 A1* | 9/2013 | Iida | G06F 3/044 324/661 |
| 2013/0257784 A1 | 10/2013 | Vandermeijden et al. | |
| 2014/0028616 A1* | 1/2014 | Furutani | G06F 3/044 345/174 |
| 2014/0049506 A1 | 2/2014 | Lin | |
| 2014/0062934 A1 | 3/2014 | Coulson et al. | |
| 2014/0078080 A1 | 3/2014 | Kim et al. | |
| 2014/0204049 A1 | 7/2014 | Tsai et al. | |
| 2014/0210791 A1 | 7/2014 | Hanauer et al. | |
| 2014/0267128 A1 | 9/2014 | Bulea et al. | |
| 2014/0307186 A1 | 10/2014 | Yun et al. | |
| 2015/0168767 A1 | 6/2015 | Yonemura | |
| 2015/0169121 A1 | 6/2015 | Yao et al. | |
| 2015/0212633 A1 | 7/2015 | Yamagishi et al. | |
| 2015/0235607 A1 | 8/2015 | Nakanishi et al. | |
| 2015/0355771 A1 | 12/2015 | Watazu et al. | |
| 2015/0370373 A1 | 12/2015 | Barel | |
| 2016/0034087 A1 | 2/2016 | Kim et al. | |
| 2016/0035290 A1 | 2/2016 | Kim et al. | |
| 2016/0062500 A1 | 3/2016 | Kessler et al. | |
| 2016/0085336 A1 | 3/2016 | Kim et al. | |
| 2016/0088133 A1 | 3/2016 | Kim et al. | |
| 2016/0209984 A1 | 7/2016 | Richards | |

FOREIGN PATENT DOCUMENTS

| | | |
|---|---|---|
| CN | 203386194 | 1/2014 |
| JP | 2007048275 | 2/2007 |
| JP | 2007322587 | 12/2007 |
| JP | 2009163363 | 7/2009 |
| JP | 2010244514 | 10/2010 |
| JP | 2011081578 | 4/2011 |
| JP | 2011086191 | 4/2011 |
| JP | 2011258043 | 12/2011 |
| JP | 2017235224 | 11/2012 |
| JP | 2013015976 | 1/2013 |
| JP | 2013088932 | 5/2013 |
| JP | 2013105154 | 5/2013 |
| JP | 2013242770 | 12/2013 |
| JP | 2014194591 | 10/2014 |
| JP | 5798700 | 10/2015 |
| KR | 200900776126 | 7/2009 |
| KR | 20100025176 | 3/2010 |
| KR | 1020110022727 | 3/2011 |
| KR | 20110039304 | 4/2011 |
| KR | 1033154 | 5/2011 |
| KR | 1020110128724 | 11/2011 |
| KR | 20120053716 | 5/2012 |
| KR | 20120139518 | 12/2012 |
| KR | 101311235 | 9/2013 |
| KR | 1020130127176 | 11/2013 |
| KR | 20130131647 | 12/2013 |
| KR | 1020140096905 | 8/2014 |
| KR | 20150011271 | 1/2015 |
| KR | 101506511 | 4/2015 |
| WO | WO2011013588 | 2/2011 |
| WO | WO2011111906 | 9/2011 |
| WO | WO2014017248 | 1/2014 |
| WO | WO2014080924 | 5/2014 |
| WO | WO2013132736 | 7/2015 |
| WO | WO2015106183 | 7/2015 |

OTHER PUBLICATIONS

Corresponding Search Report Issued by the EPO dated Aug. 27, 2015.
Corresponding Office Action Issued by the KIPO dated Oct. 19, 2015.
Corresponding Office Action Issued by the JPO dated Jul. 14, 2015.
Corresponding Office Action Issued by the KIPO dated Sep. 30, 2015.
Corresponding Office Action Issued by the JPO dated Jul. 28, 2015.
Corresponding Office Action Issued by the KIPO dated Sep. 23, 2015.
Corresponding Office Action issued by JPO dated Aug. 25, 2015.
Corresponding U.S Appl. No. 14/992,568, filed Jan. 11, 2016.
Corresponding. U.S. Appl. No. 15/007,240, filed Jan. 27, 2016.
Corresponding U.S. Appl. No. 15/009,951, filed Jan. 29, 2016.
Corresponding U.S. Appl. No. 14/992,668, filed Jan. 11, 2016.
Corresponding U.S. Appl. No. 15/007,245, filed Jan. 27, 2016.
Corresponding U.S. Appl. No. 15/009,973, filed Jan. 29, 2016.
Corresponding U.S. Appl. No. 14/820,942, filed Aug. 7, 2015.
Corresponding U.S. Appl. No. 14/908,706, filed Jan. 29, 2016.
Corresponding U.S. Appl. No. 15/071,561, filed Mar. 16, 2016.
Corresponding Office Action issued by the SIPO dated Nov. 30, 2017.
References cited in Final Office Action dated Mar. 26, 2018 in Corresponding U.S. Appl. No. 14/908,706. US.
Corresponding Non-Final Office Action issued by the USPTO for U.S. Appl. No. 14/745,514 dated Jan. 25, 2018.

* cited by examiner

[Fig. 1]
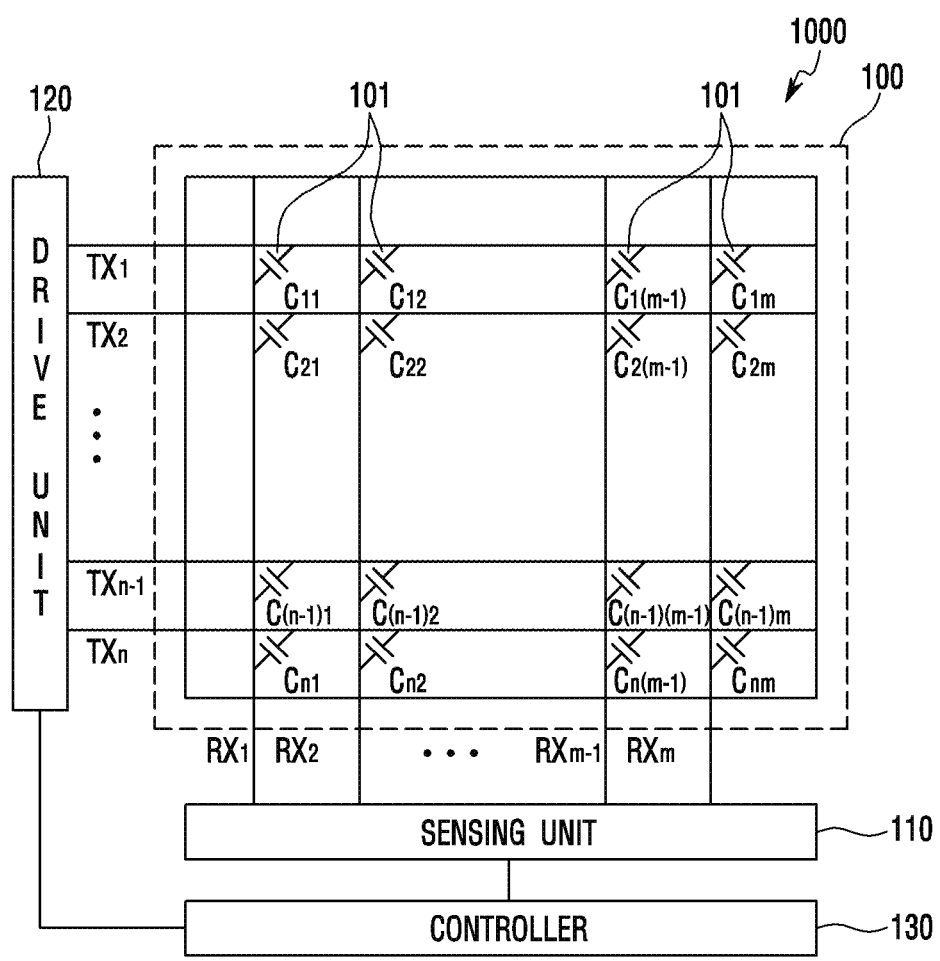

[Fig. 2a]
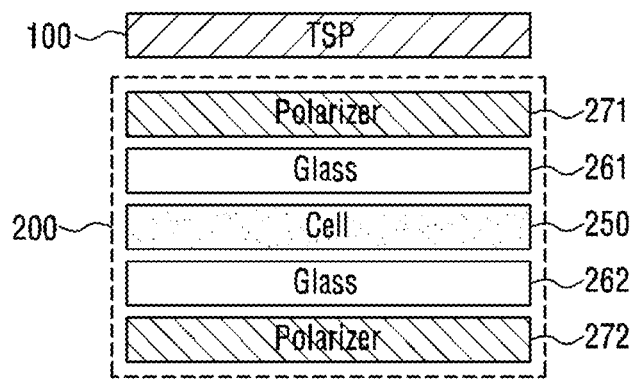
[Fig. 2b]
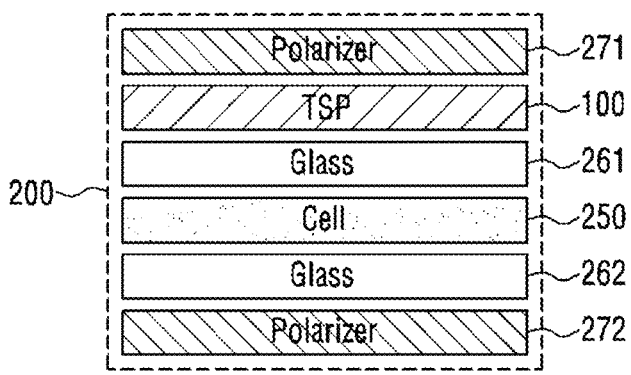
[Fig. 2c]
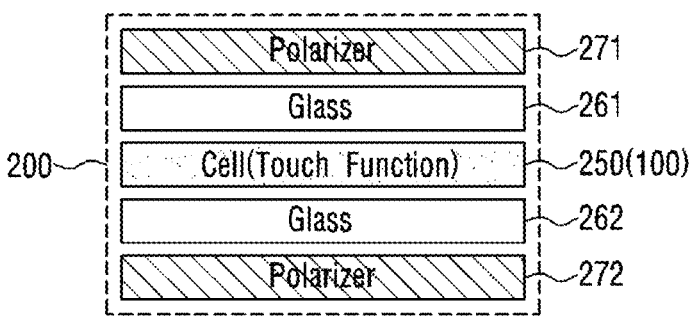

[Fig. 3]
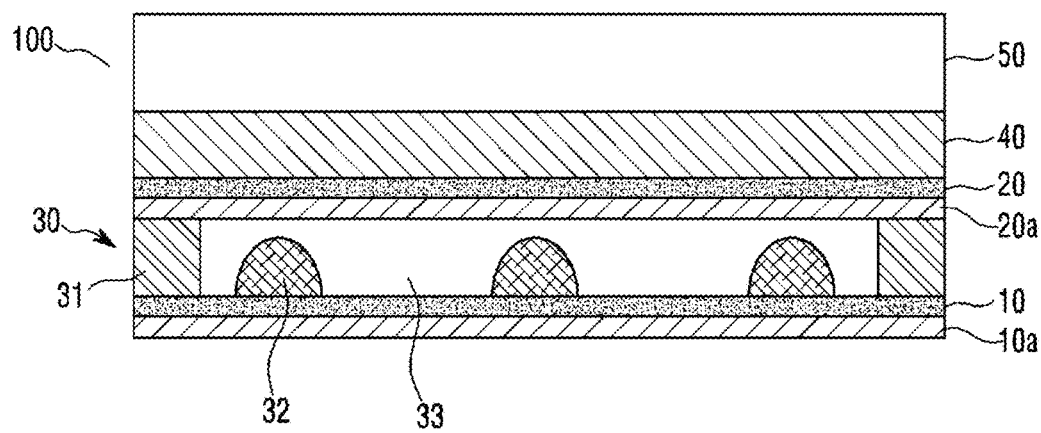
[Fig. 4]
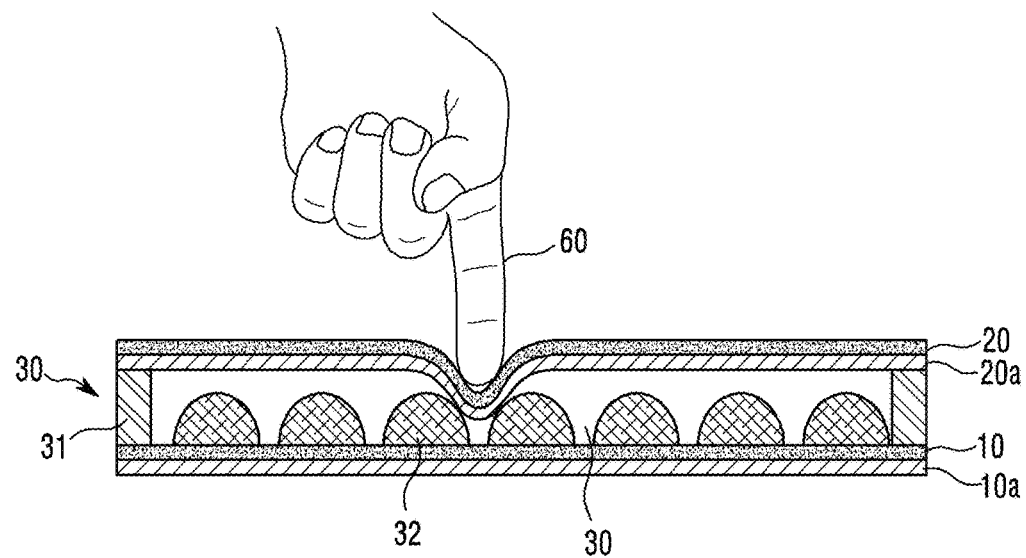

[Fig. 5a]
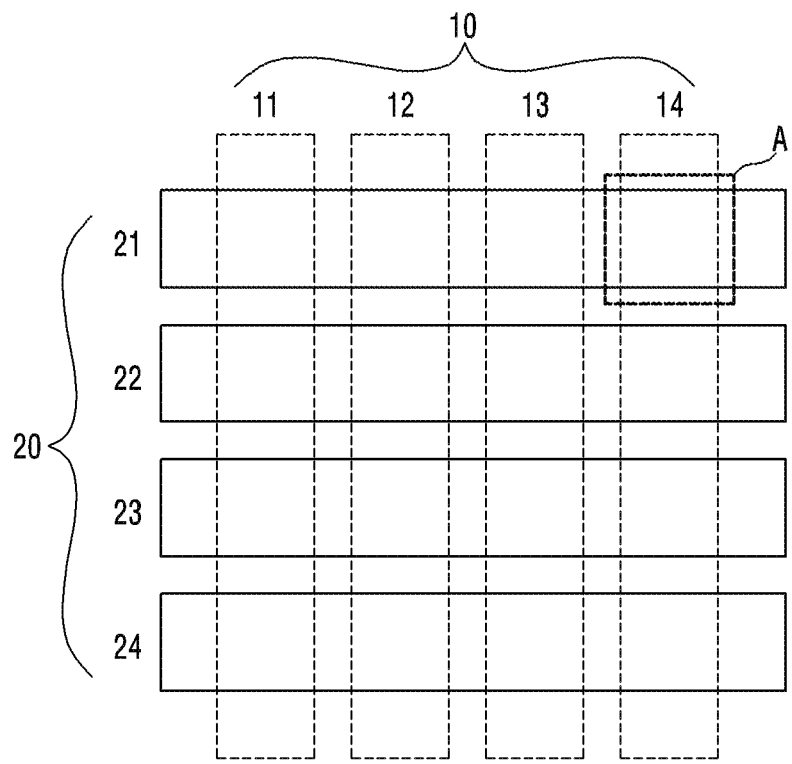
[Fig. 5b]
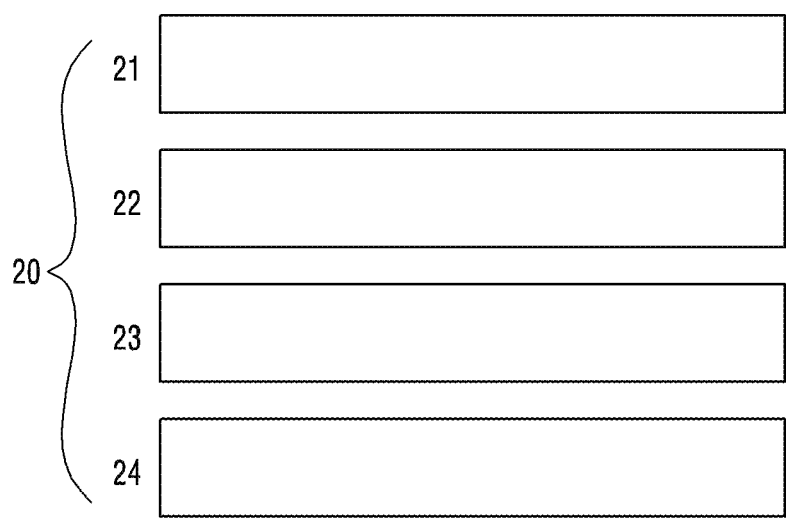

[Fig. 5c]
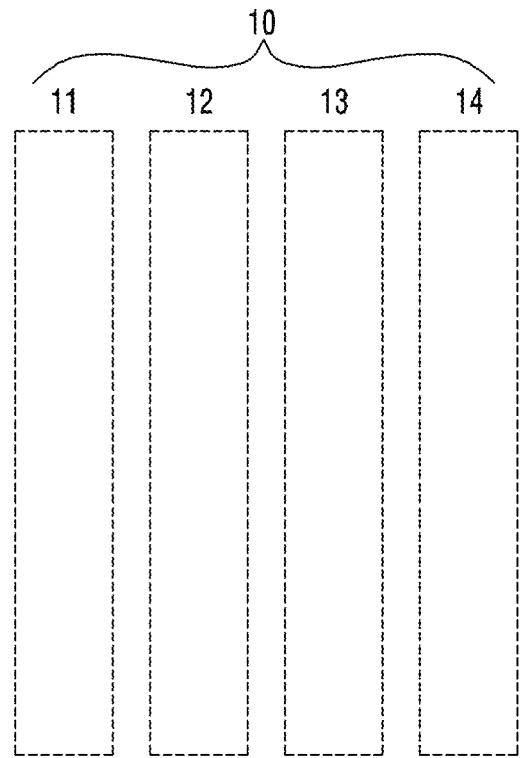
[Fig. 5d]
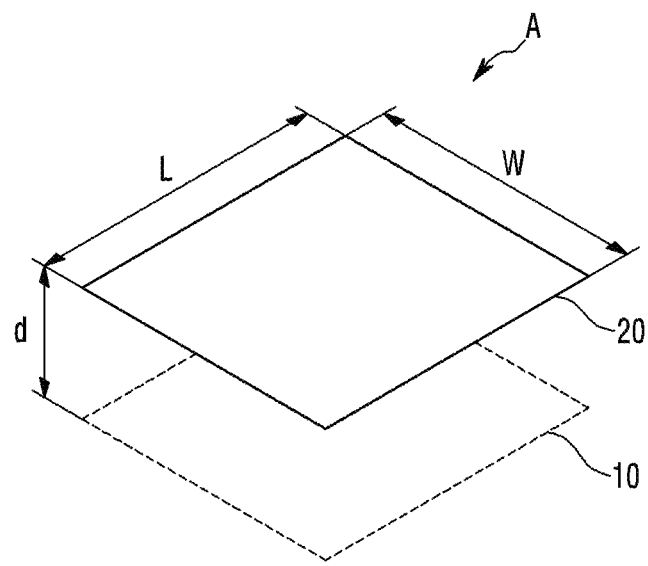

[Fig. 6a]
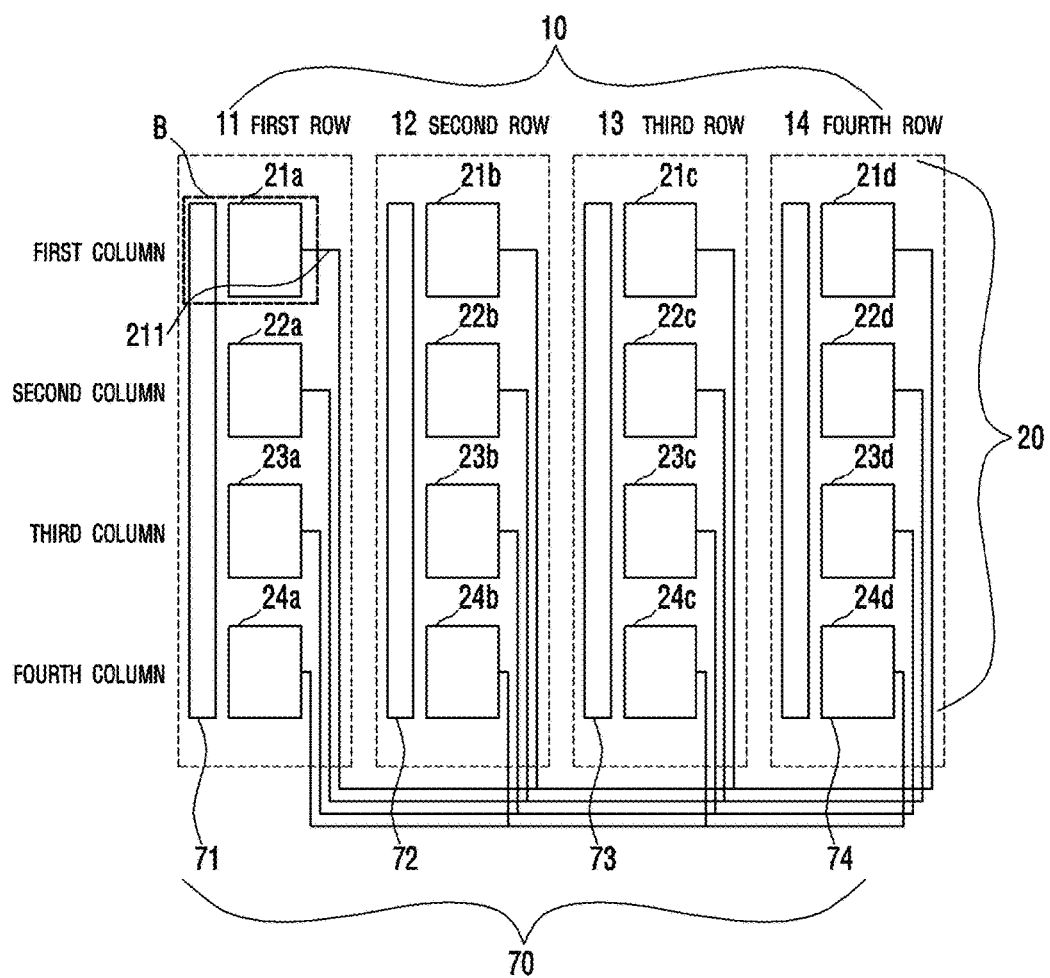

[Fig. 6b]
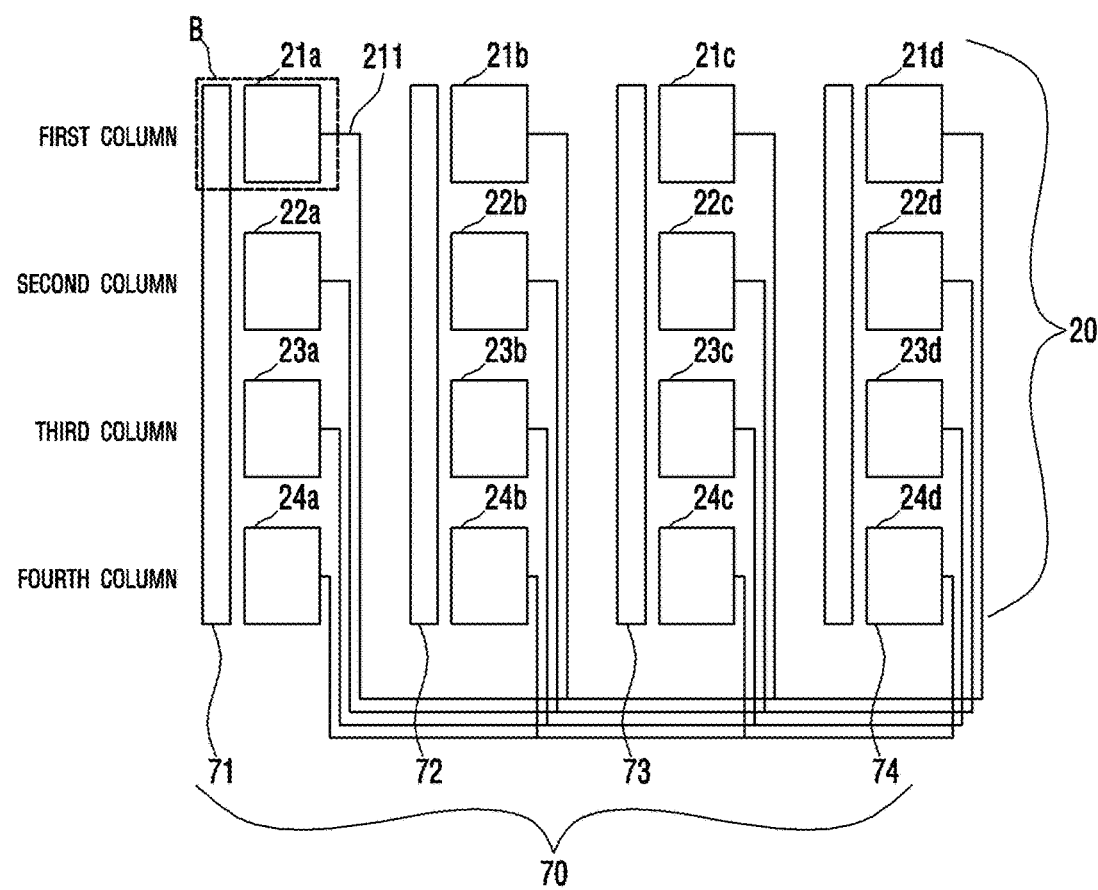

[Fig. 6c]
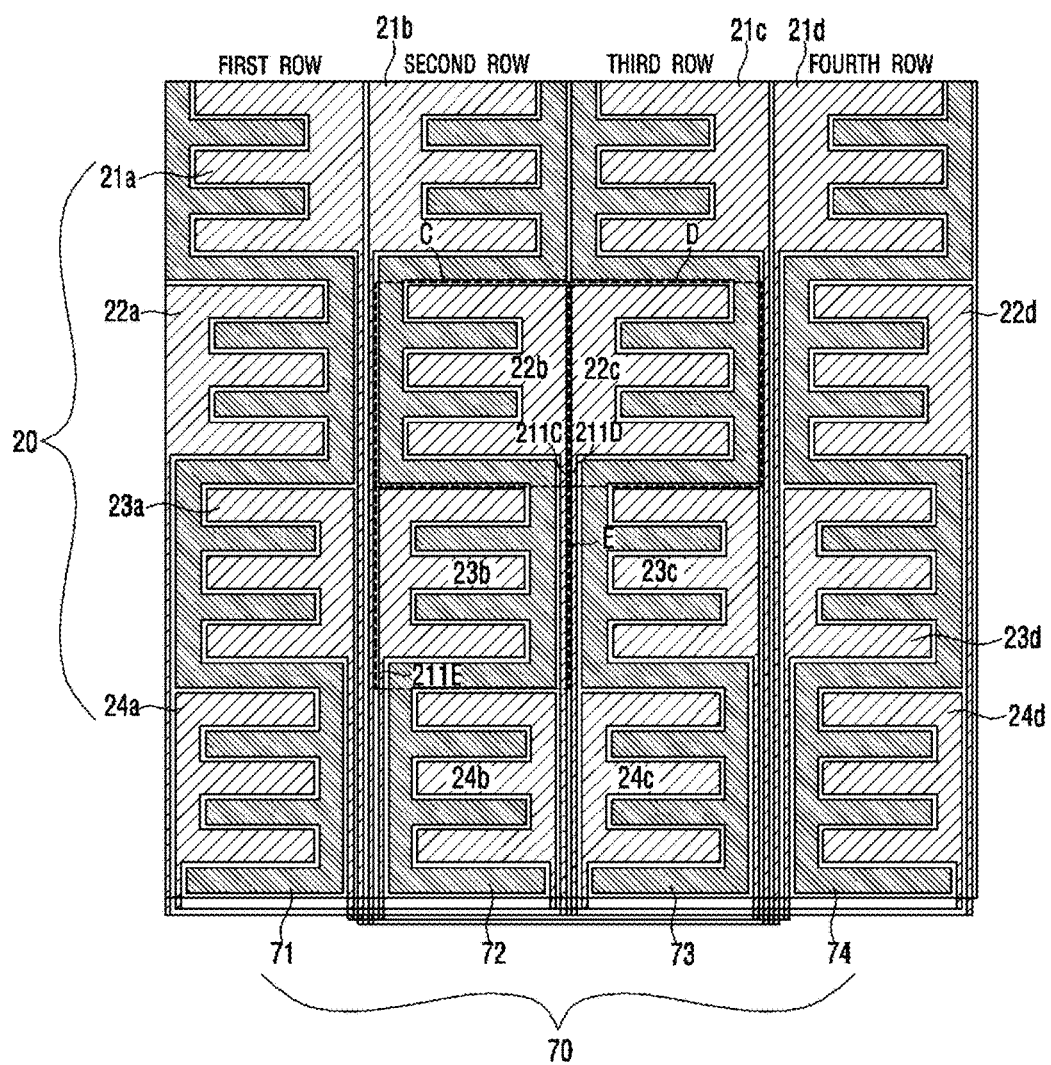

[Fig. 6d]
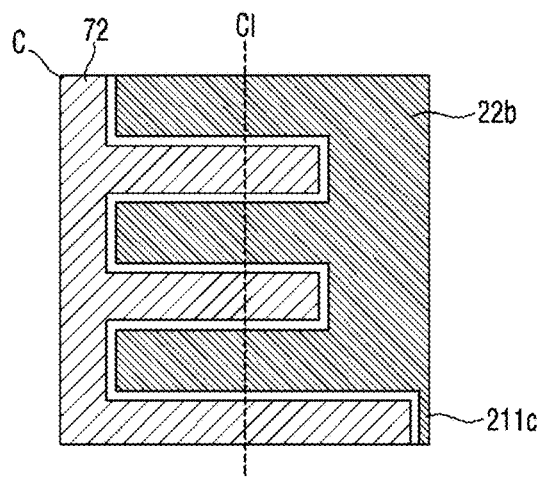
[Fig. 7]
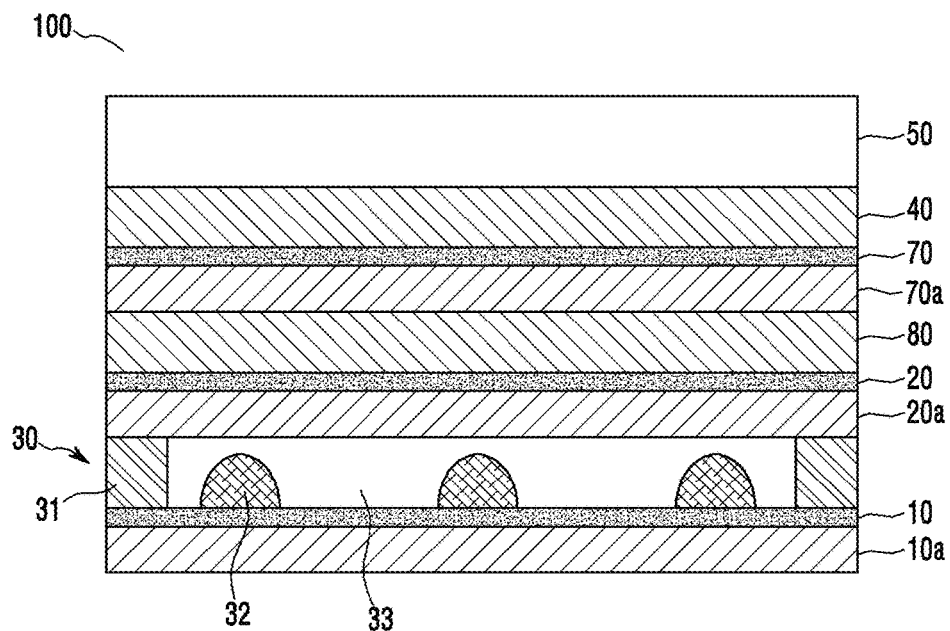

[Fig. 8a]
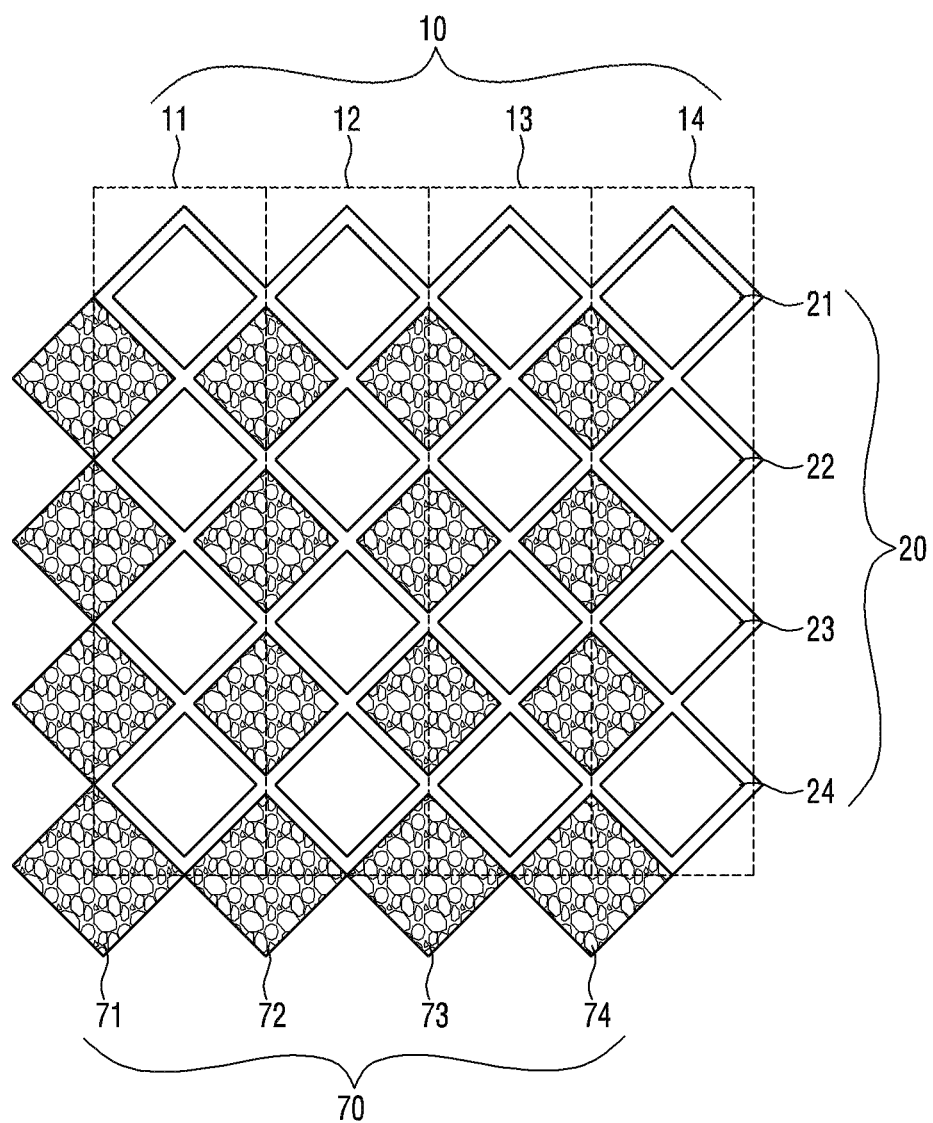

[Fig. 8b]
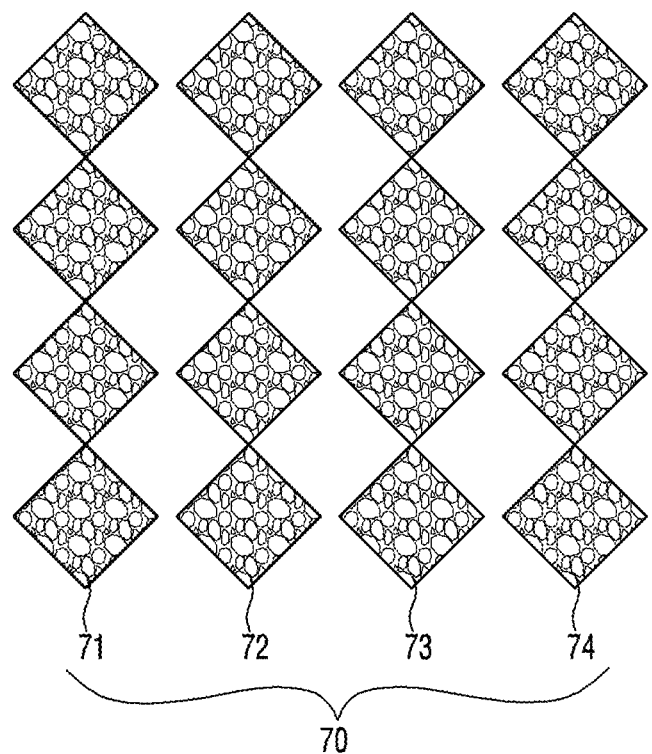
[Fig. 8c]
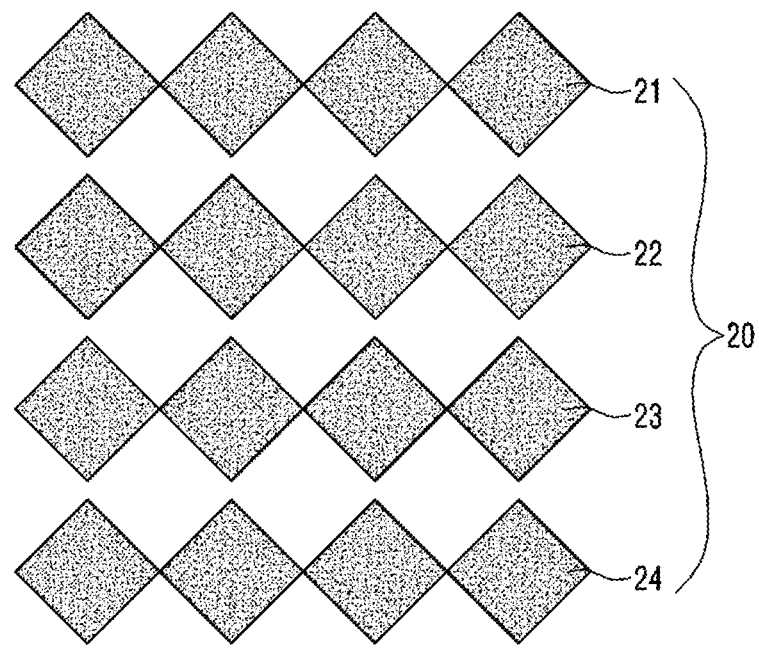

[Fig. 9]
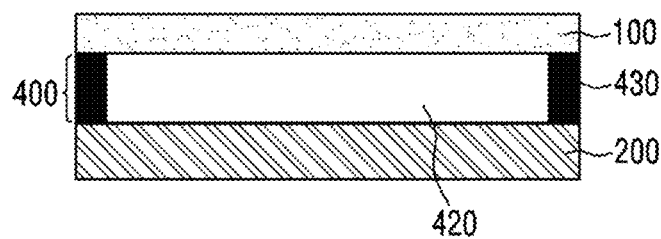
[Fig. 10]
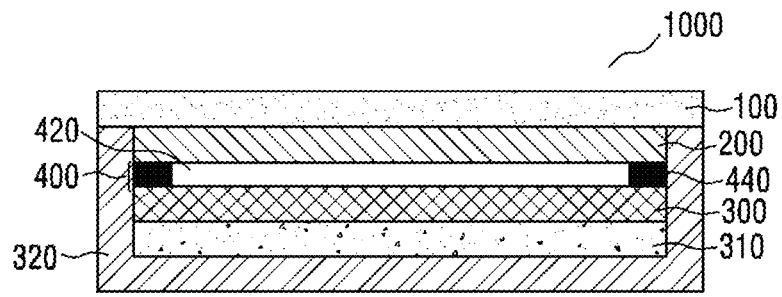

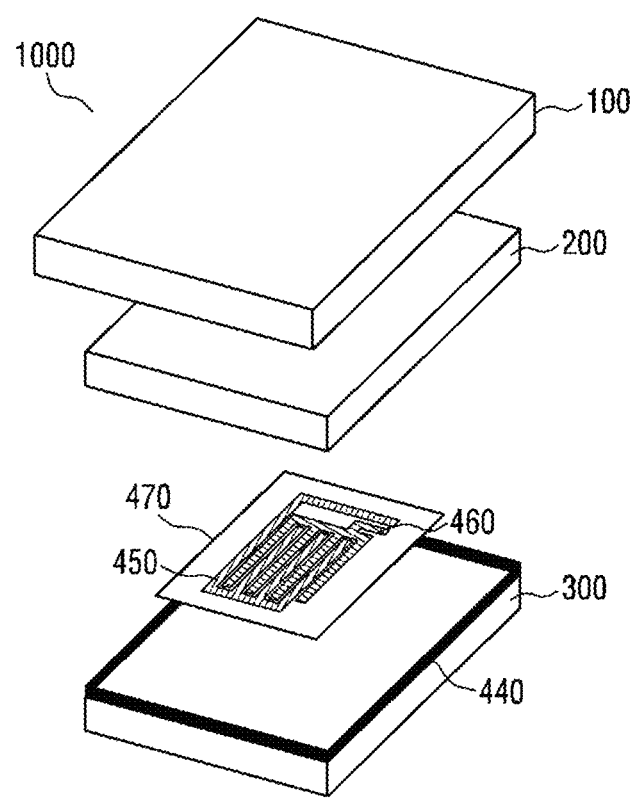
[Fig. 11]

[Fig. 12a]
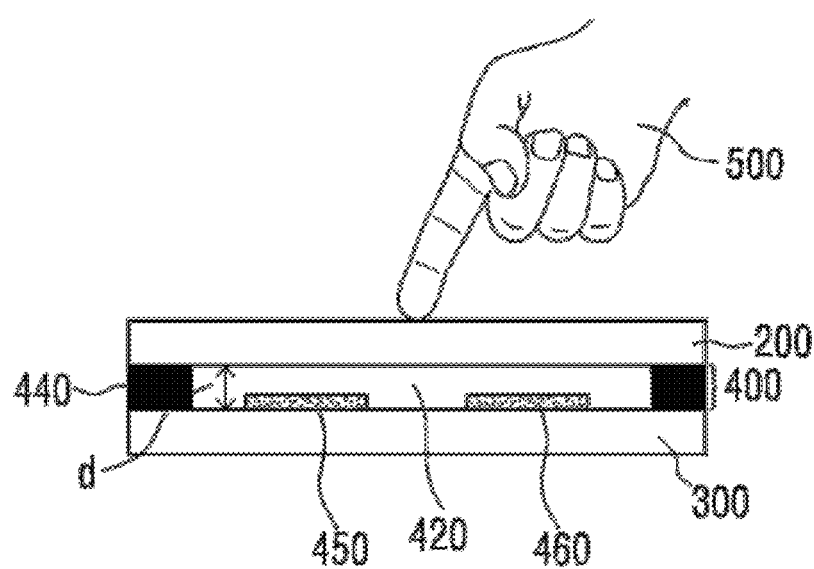
[Fig. 12b]
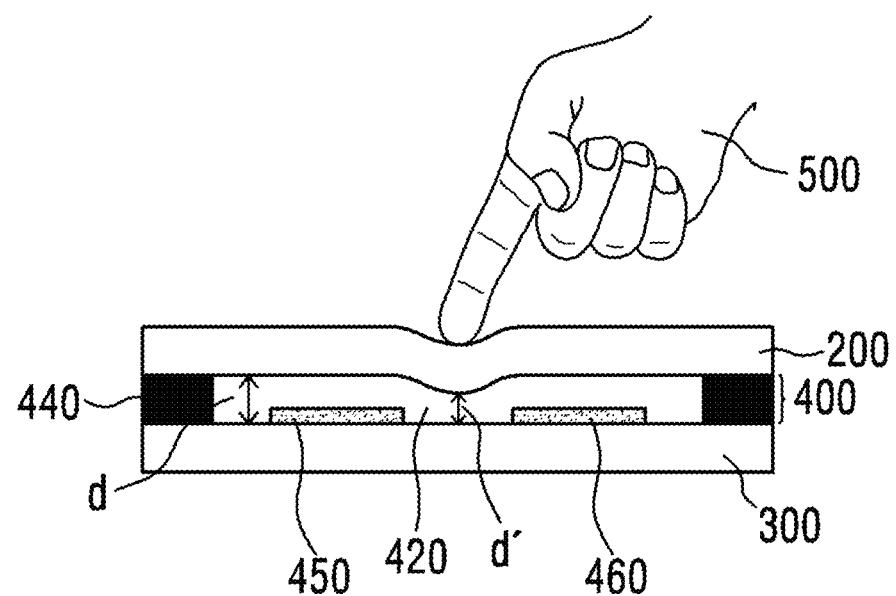

[Fig. 12c]
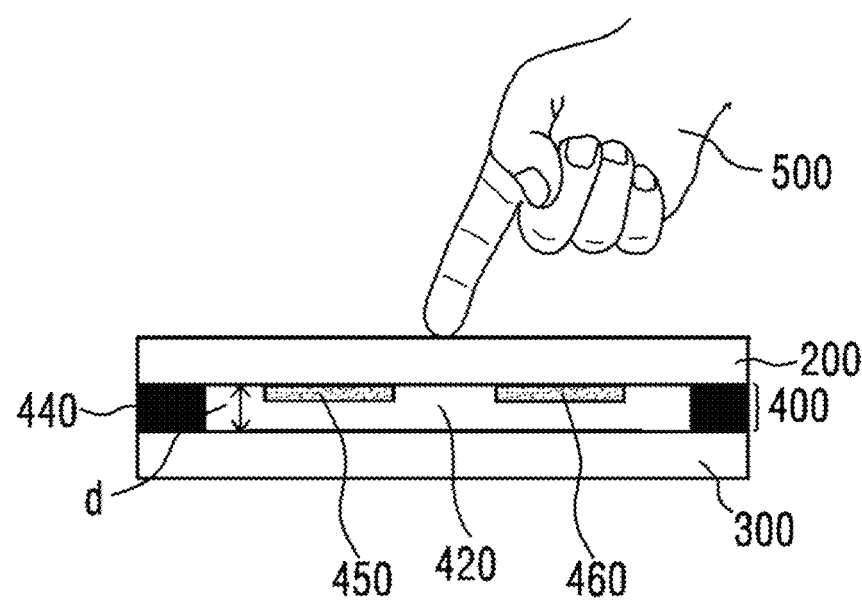
[Fig. 12d]
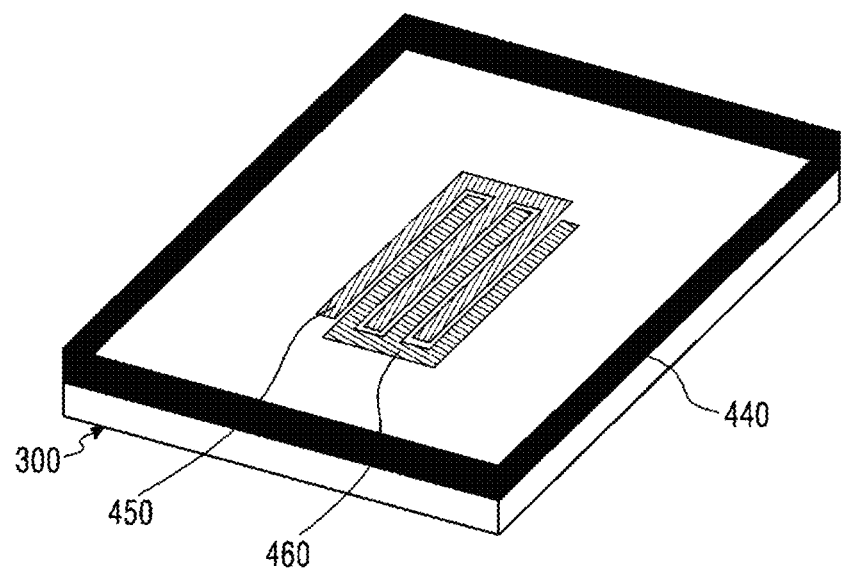

[Fig. 12e]
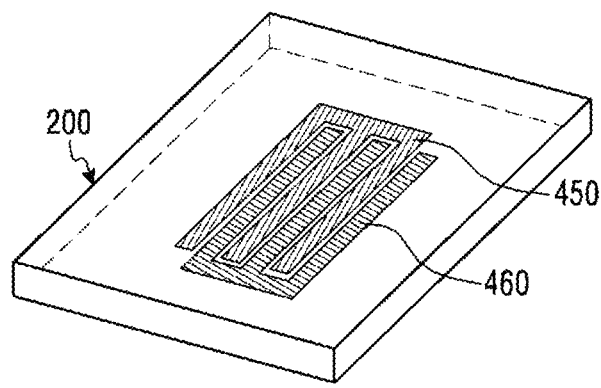
[Fig. 12f]
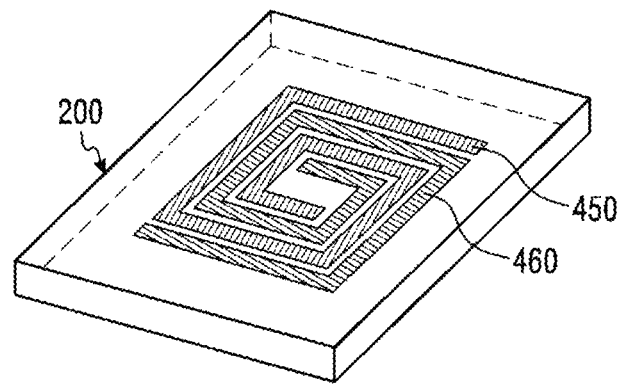
[Fig. 12g]
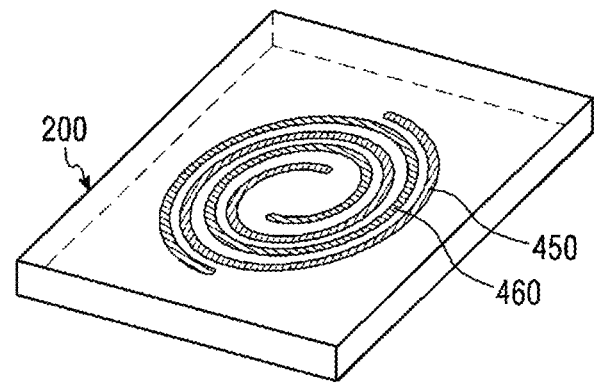

[Fig. 13a]
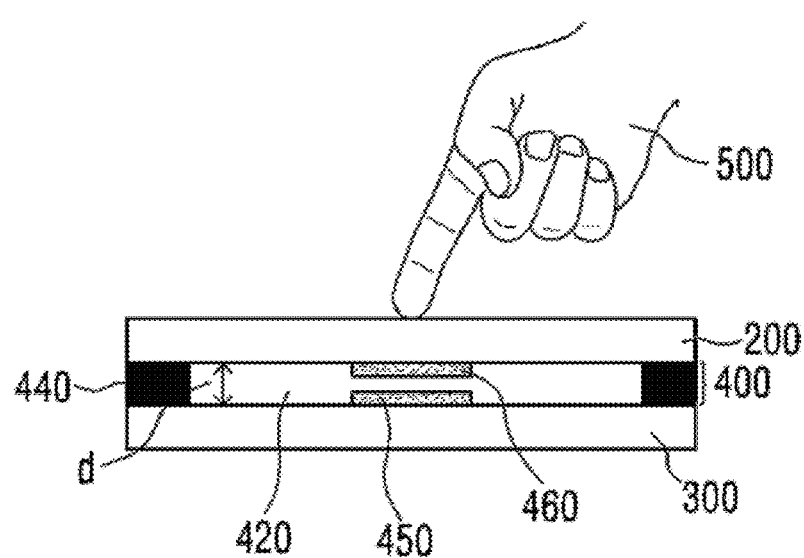
[Fig. 13b]
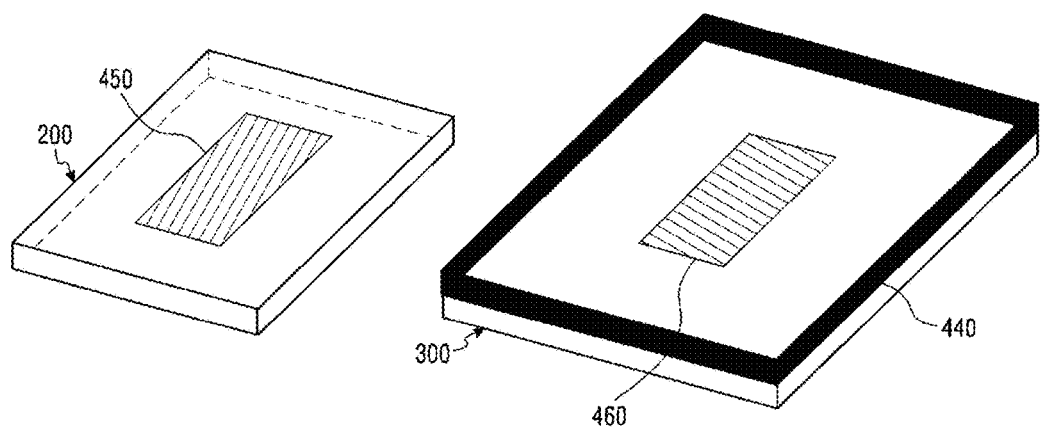

[Fig. 14]
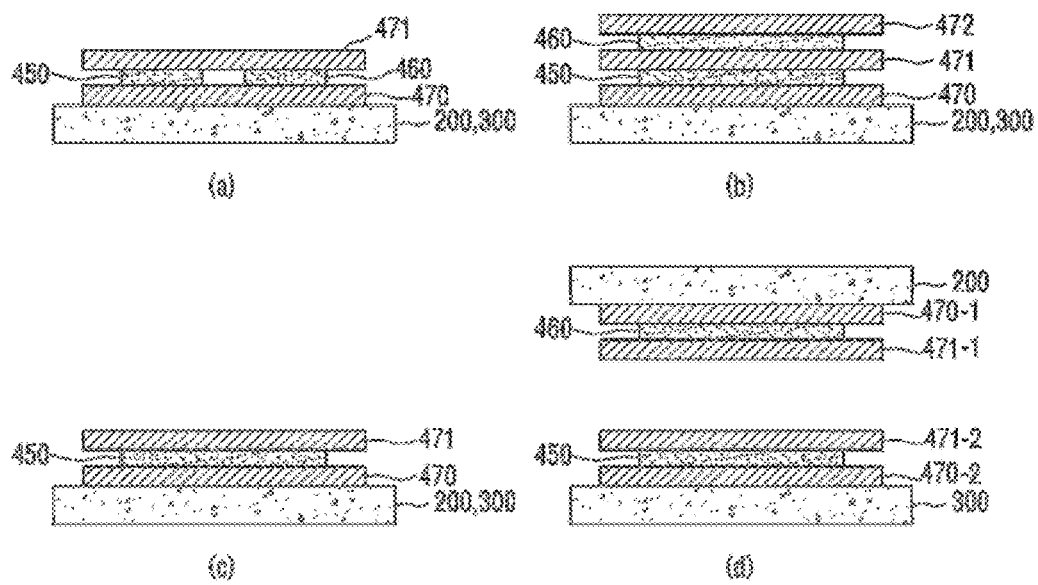
[Fig. 15a]
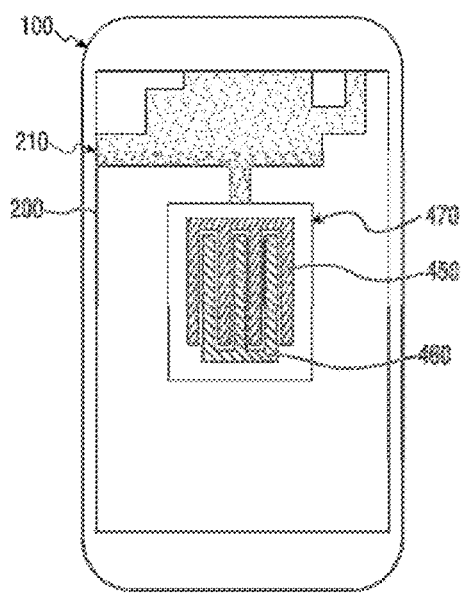

[Fig. 15b]
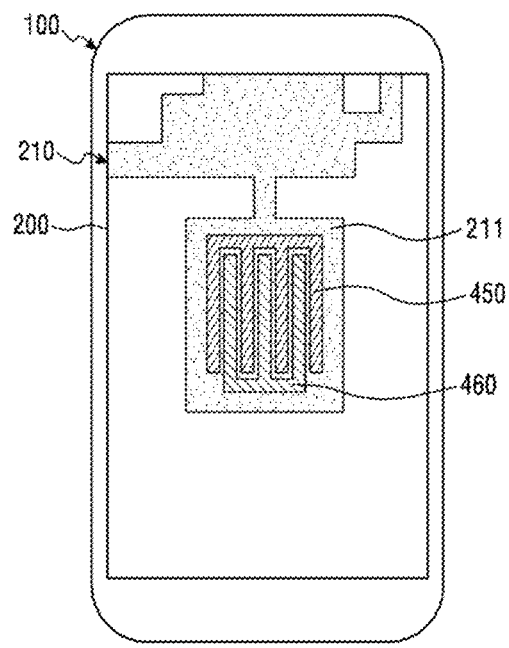
[Fig. 16a]
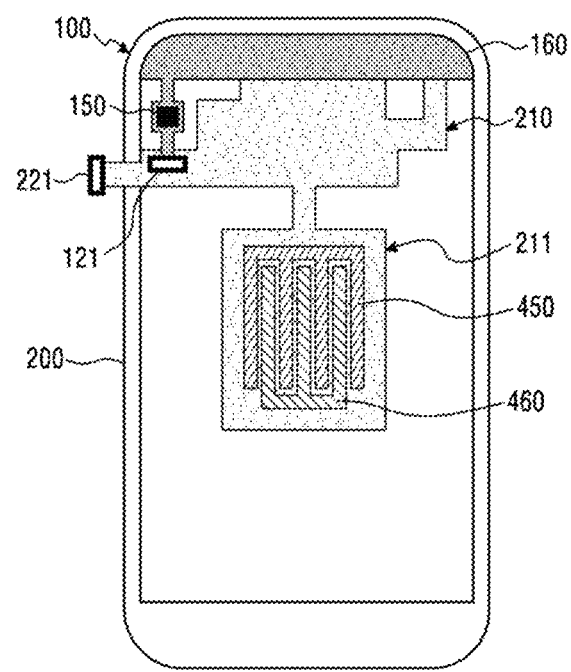

[Fig. 16b]
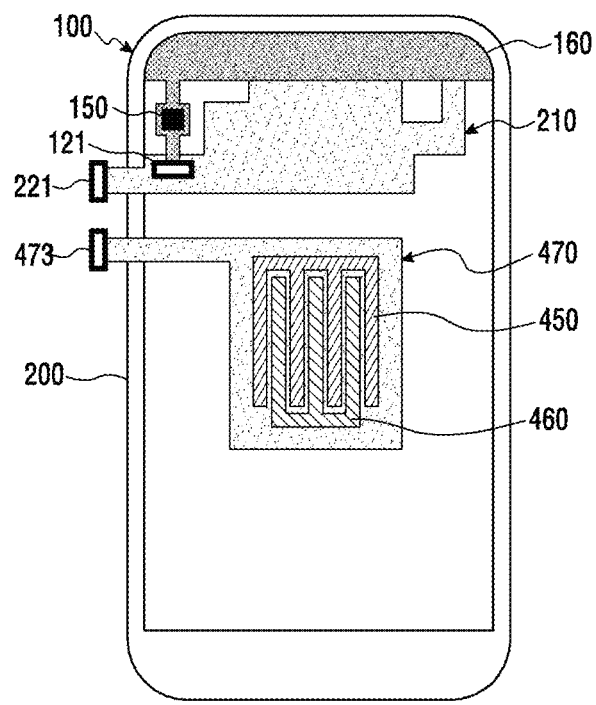
[Fig. 16c]
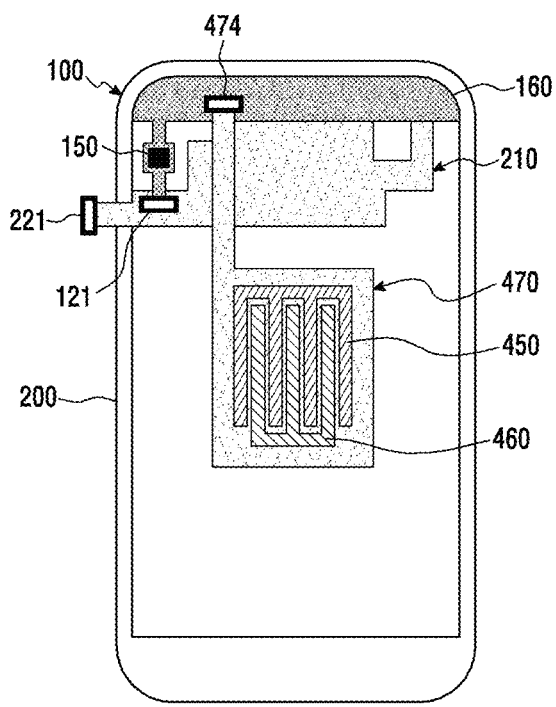

[Fig. 17a]
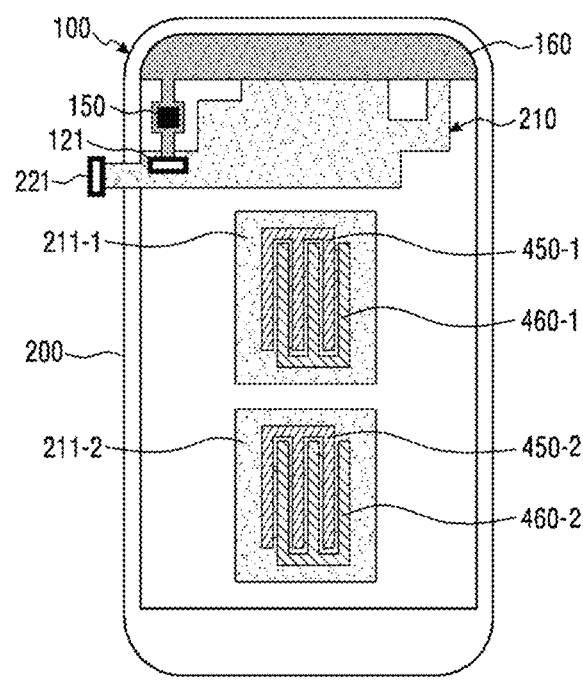
[Fig. 17b]
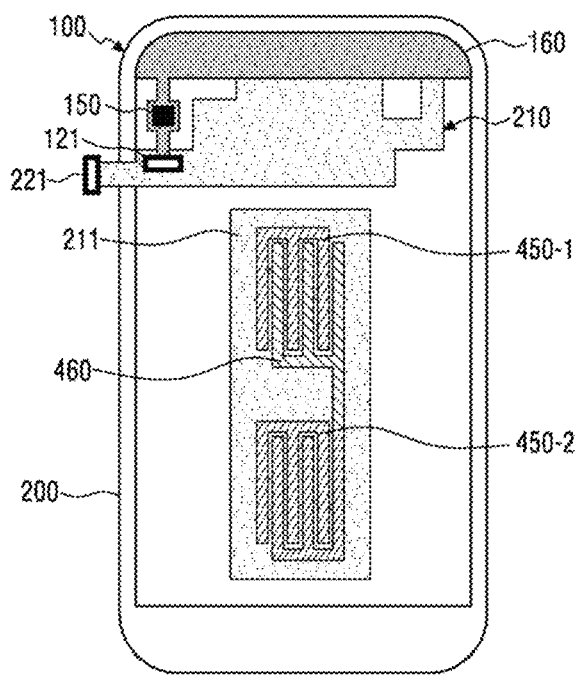

[Fig. 17c]
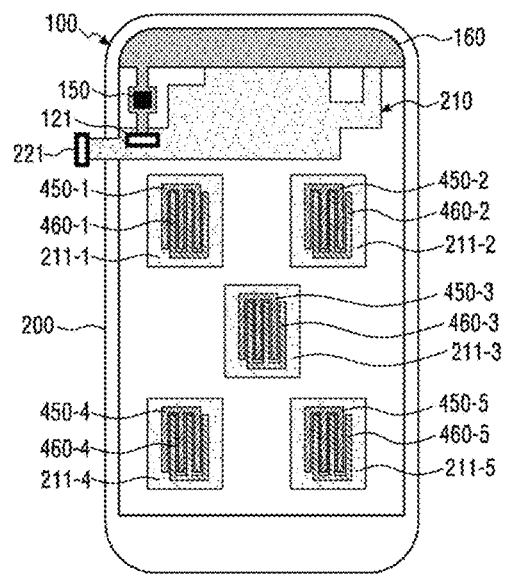
[Fig. 18]
(CAPACITANCE CHANGE AMOUNT)
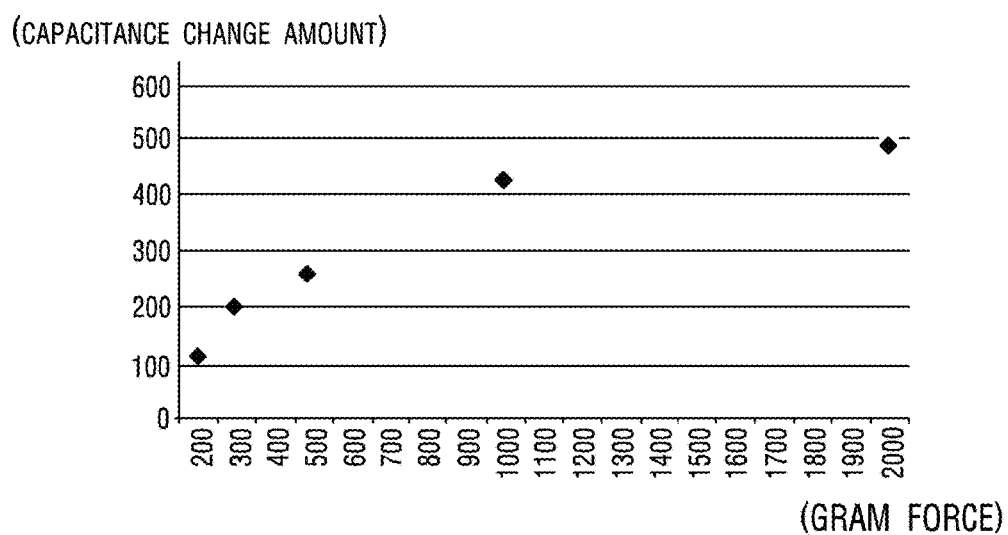
(GRAM FORCE)

TOUCH INPUT DEVICE WITH EDGE SUPPORT MEMBER

CROSS-REFERENCE TO RELATED APPLICATIONS

The present application is a continuation in part of U.S. patent application Ser. No. 14/745,514, filed Jun. 22, 2015, which claims priority under 35 U.S.C. § 119 to Korean Patent Application No. 10-2014-0098917, filed Aug. 1, 2014. The present application is also a continuation in part of U.S. patent application Ser. No. 14/908,706, filed Jan. 29, 2016, which claims priority as a national stage application, under 35 U.S.C. § 371, to international patent application No. PCT/KR2014/006907, filed Jul. 29, 2014, which claims priority to Korean Patent Application No. 10-2013-0089516, filed Jul. 29, 2013. The disclosures of the aforementioned priority applications are incorporated herein by reference in their entirety.

TECHNICAL FIELD

Embodiments may relate to a touch sensor panel, and more particularly to a touch sensor panel capable of sensing not only a touch on the touch sensor panel and a position of the touch but also a magnitude of a pressure of the touch through capacitance change, a touch detection device for the same, and a touch input device including the both.

BACKGROUND

A variety of input devices are now being used for the operation of a computing system. For example, the input device includes a button, a key, a joystick and a touch screen. Thanks to an easy and simple operation of the touch screen, the touch screen is now increasingly used in the operation of the computing system.

The touch screen may constitute a touch surface of a touch input device including a touch sensor panel which is a transparent panel and has a touch-sensitive surface. The touch sensor panel is attached to the entire surface of a display screen, so that the touch-sensitive surface may cover the visible side of the display screen. The touch screen allows a user to simply touch the touch screen with user's finger, etc., and to operate the computing system. Generally, the touch screen can recognize the touch on the display screen and a position of the touch, and then the computing system analyzes the touch and performs operations according to the analysis.

Here, there is a requirement for a touch sensor panel and/or a touch input device capable of sensing not only the touch on the touch screen and the touch position but also a magnitude of a pressure from the touch by sensing capacitance change caused by the touch on the touch screen.

BRIEF SUMMARY

Technical Problem

An object of the present invention is to provide a touch sensor panel capable of sensing not only a touch on a surface of the touch sensor panel and a position of the touch but also a magnitude of a pressure of the touch, a touch detection device for the same, and a touch input device including the both.

Also, another object of the present invention is to provide a touch sensor panel capable of sensing not only a touch on the touch sensor panel and a position of the touch but also a magnitude of a pressure of the touch by sensing capacitance change, a touch detection device for the same, and a touch input device including the both.

Technical Solution

One embodiment is a touch input device including: a first electrode; a second electrode located on one side of the first electrode; a display disposed on one side of the first electrode opposite to the second electrode; and a spacer layer located between the first electrode and the second electrode. At least one of the first electrode and the second electrode comprises a plurality of electrodes. The first electrode and the second electrode are spaced apart from each other by a predetermined distance. One of the first electrode and the second electrode is a drive electrode to which a drive signal is applied. The other one of the first electrode and the second electrode is a receiving electrode receives the drive signal by a mutual capacitance between the first electrode and the second electrode. When an external pressure is applied to the first electrode through the display, the first electrode is concavely bent toward the second electrode in response to the external pressure. The mutual capacitance between the first electrode and the second electrode changes according to a distance between the first electrode and the second electrode. The magnitude of the external pressure according to the change of the capacitance between the first electrode and the second electrode is detected.

Another embodiment is a touch input device including: a first electrode; a substrate located on one side of the first electrode; a display disposed on one side of the first electrode opposite to the substrate; and a spacer layer located between the first electrode and the substrate. The first electrode and the substrate are overlapped with each other. The spacer layer is formed by a support member disposed on edge portions of the substrate. The first electrode and the substrate are spaced apart from each other by a predetermined distance at rest portions. When an external pressure is applied to the first electrode through the display, the first electrode is concavely bent toward the substrate in response to the external pressure. The capacitance between the first electrode and the substrate changes according to a distance between the first electrode and the substrate. The magnitude of the external pressure according to the change of the capacitance between the first electrode and the substrate is detected.

Also, further another embodiment is a touch input device including: a display; a second electrode; and a spacer layer located between the second electrode and the display. The second electrode and the display are overlapped with each other. The spacer layer is formed by a support member disposed on edge portions of the second electrode. The second electrode and the display are spaced apart from each other by a predetermined distance at rest portions. When an external pressure is applied to the display, the display is concavely bent toward the second electrode in response to the external pressure. The capacitance between the second electrode and the display changes according to a distance between the second electrode and the display. The magnitude of the external pressure according to the change of the capacitance between the second electrode and the display is detected.

Advantageous Effects

According to the embodiment of the present invention, it is possible to provide a touch sensor panel capable of sensing not only a touch on a surface of the touch sensor panel and a position of the touch but also a magnitude of a pressure of the touch, a touch detection device for the same, and a touch input device including the both.

Also, according to the embodiment of the present invention, it is possible to provide a touch sensor panel capable of sensing not only a touch on the touch sensor panel and a position of the touch but also a magnitude of a pressure of the touch by sensing capacitance change, a touch detection device for the same, and a touch input device including the both.

BRIEF DESCRIPTION OF DRAWINGS

FIG. 1 is a schematic view of a capacitive touch input device according to an embodiment of the present invention;

FIGS. 2a, 2b and 2c are conceptual views showing a relative position of the touch sensor panel with respect to a display module in a touch input device according to the embodiment of the present invention;

FIG. 3 is a cross sectional view of a capacitive touch sensor panel included in a touch input device according to a first embodiment of the present invention;

FIG. 4 shows a state where pressure is applied to the touch sensor panel included in the touch input device according to the first embodiment of the present invention;

FIG. 5a shows a first example of patterns of a first electrode and a second electrode of the touch sensor panel included in the touch input device according to the first embodiment of the present invention;

FIG. 5b shows separately the pattern of the first electrode shown in FIG. 5a;

FIG. 5c shows separately the pattern of the second electrode shown in FIG. 5a;

FIG. 5d is an enlarged view of a part "A" of FIG. 5a;

FIG. 6a shows a second example of patterns of a first electrode, a second electrode and a third electrode of the touch sensor panel included in the touch input device according to the first embodiment of the present invention;

FIG. 6b shows separately the patterns of the second and third electrodes shown in FIG. 6a;

FIG. 6c shows a third example of patterns of a first electrode, a second electrode and a third electrode of the touch sensor panel included in the touch input device according to the first embodiment of the present invention;

FIG. 6d is an enlarged view of a part "C" of FIG. 6c;

FIG. 7 is a schematic view of a capacitive touch sensor panel included in a touch input device according to a second embodiment of the present invention;

FIG. 8a shows a fourth example of patterns of a first electrode, a second electrode and a third electrode of the touch sensor panel included in the touch input device according to the second embodiment of the present invention;

FIG. 8b shows separately the pattern of the second electrode of FIG. 8a;

FIG. 8c shows separately the pattern of the third electrode of FIG. 8a;

FIG. 9 is a cross sectional view of a touch input device configured to detect the touch position and touch pressure in accordance with a third embodiment of the present invention;

FIG. 10 is a cross sectional view of a touch input device according to a fourth embodiment of the present invention;

FIG. 11 is a perspective view of the touch input device according to the fourth embodiment of the present invention;

FIG. 12a is a cross sectional view of the touch input device including a first example of the pressure electrode pattern according to the fourth embodiment of the present invention;

FIG. 12b is a cross sectional view showing a case where a pressure has been applied to the touch input device shown in FIG. 12a;

FIG. 12c is a cross sectional view of the touch input device including a second example of the pressure electrode pattern according to the fourth embodiment of the present invention;

FIG. 12d shows the first example of the pressure electrode pattern of the present invention;

FIG. 12e shows the second example of the pressure electrode pattern of the present invention;

FIGS. 12f to 12g show pressure electrode patterns which can be applied to the embodiment of the present invention;

FIG. 13a is a cross sectional view of the touch input device including a third example of the pressure electrode pattern according to the fourth embodiment of the present invention;

FIG. 13b shows the third example of the pressure electrode pattern of the present invention;

FIG. 14 shows an attachment structure of the pressure electrode according the embodiment of the present invention;

FIGS. 15a and 15b show an attachment method of the pressure electrode according the fourth embodiment of the present invention;

FIGS. 16a to 16c show how the pressure electrode is connected to a touch sensing circuit in accordance with the fourth embodiment of the present invention;

FIGS. 17a to 17c show that the pressure electrode constitutes a plurality of channels in accordance with the embodiment of the present invention; and FIG. 18 is a graph that, when an experiment where the central portion of the touch surface of the touch input device according to the embodiment of the present invention is pressed by the non-conductive object is performed, represents a capacitance change amount according to a gram force of the object.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a capacitive touch sensor panel, a touch detection device and a touch input device including the both in accordance with embodiments of the present invention will be described with reference to the accompanying drawings. While a capacitance type touch sensor panel 100 and a pressure detection module 400 are described below, the touch sensor panel 100 and the pressure detection module 400 may be adopted, which are capable of detecting a touch position and/or touch pressure by any method.

FIG. 1 is a schematic view of a configuration of the capacitive touch input device and the operation thereof according to the embodiment of the present invention. Referring to FIG. 1, the touch input device 1000 according to the embodiment of the present invention may include a touch sensor panel 100 including a plurality of drive electrodes TX1 to TXn and a plurality of receiving electrodes RX1 to RXm, and may include a drive unit 120 which applies a drive signal to the plurality of drive electrodes TX1 to TXn, and a sensing unit 110 which detects a touch, a touch position and/or a magnitude of a pressure of the touch by receiving a sensing signal including information on a capacitance change amount changing according to the touch on a touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitude of the value may be changed depending on the embodiment.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

In the touch sensor panel 100 according to the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in the different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may be formed to include at least any one of silver ink, copper or carbon nanotube (CNT). Also, the drive electrode TX and the receiving electrode RX may be made of metal mesh or nano silver.

The drive unit 120 according to the embodiment of the present invention may apply a driving signal to the drive electrodes TX1 to TXn. In the touch input device 1000 according to the embodiment of the present invention, one driving signal may be sequentially applied at a time to the first drive electrode TX1 to the n-th drive electrode TXn. The driving signal may be applied again repeatedly. This is just an example. The driving signal may be applied to the plurality of drive electrodes at the same time in accordance with the embodiment.

Through the receiving electrodes RX1 to RXm, the sensing unit 110 receives the sensing signal including information on a capacitance (Cm) 101 generated between the receiving electrodes RX1 to RXm and the drive electrodes TX1 to TXn to which the driving signal has been applied, thereby detecting whether or not the touch has occurred, the touch position and/or the magnitude of the touch pressure. For example, the sensing signal may be a signal coupled by the capacitance (Cm) 101 generated between the receiving electrode RX and the drive electrode TX to which the driving signal has been applied. As such, the process of sensing the driving signal applied from the first drive electrode TX1 to the n-th drive electrode TXn through the receiving electrodes RX1 to RXm can be referred to as a process of scanning the touch sensor panel 100.

For example, the sensing unit 110 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (Cm) 101, and then converts the integrated current signal into a voltage. The sensing unit 110 may further include an analog to digital converter (ADC) (not shown) which converts the integrated data by the receiver into digital data. Later, the digital data may be input to a processor (not shown) and processed to obtain information on the touch on the touch sensor panel 100. The sensing unit 110 may include the ADC and processor as well as the receiver.

A controller 130 may perform a function of controlling the operations of the drive unit 120 and the sensing unit 110. For example, the controller 130 generates and transmits a drive control signal to the drive unit 120, so that the driving signal can be applied to a predetermined drive electrode TX1 at a predetermined time. Also, the controller 130 generates and transmits the drive control signal to the sensing unit 110, so that the sensing unit 110 may receive the sensing signal from the predetermined receiving electrode RX at a predetermined time and perform a predetermined function.

In FIG. 1, the drive unit 120 and the sensing unit 110 may constitute a touch detection device (not shown) capable of detecting whether or not the touch has occurred on the touch sensor panel 100 according to the embodiment of the present invention, the touch position and/or the touch pressure. The touch detection device according to the embodiment of the present invention may further include the controller 130. The touch detection device according to the embodiment of the present invention may be integrated and implemented on a touch sensing integrated circuit (IC, see reference numeral 150 of FIG. 16) in the touch input device 1000 including the touch sensor panel 100. The drive electrode TX and the receiving electrode RX included in the touch sensor panel 100 may be connected to the drive unit 120 and the sensing unit 110 included in touch sensing IC 150 through, for example, a conductive trace and/or a conductive pattern printed on a circuit board, or the like. The touch sensing IC 150 may be located on a circuit board on which the conductive pattern has been printed, for example, a first printed circuit board (hereafter, referred to as a first PCB) indicated by a reference numeral 160 of FIG. 16. According to the embodiment, the touch sensing IC 150 may be mounted on a main board for operation of the touch input device 1000.

As described above, a capacitance (Cm) with a predetermined value is generated at each crossing of the drive electrode TX and the receiving electrode RX. When an object like a finger approaches close to the touch sensor panel 100, the value of the capacitance may be changed. In FIG. 1, the capacitance may represent a mutual capacitance (Cm). The sensing unit 110 senses such electrical characteristics, thereby sensing whether the touch has occurred on the touch sensor panel 100 or not and where the touch has occurred. For example, the sensing unit 110 is able to sense whether the touch has occurred on the surface of the touch sensor panel 100 comprised of a 2-dimensional plane consisting of a first axis and a second axis.

More specifically, when the touch occurs on the touch sensor panel 100, the drive electrode TX to which the driving signal has been applied is detected, so that the position of the second axial direction of the touch can be detected. Likewise, when the touch occurs on the touch sensor panel 100, the change of the capacitance is detected from the reception signal received through the receiving electrode RX, so that the position of the first axial direction of the touch can be detected.

The mutual capacitance type touch sensor panel as the touch sensor panel 100 has been described in detail in the foregoing. However, in the touch input device 1000 according to the embodiment of the present invention, the touch sensor panel 100 for detecting whether or not the touch has occurred and where the touch has occurred may be implemented by using not only the above-described method but also any touch sensing method like a self-capacitance type method, a surface capacitance type method, a projected capacitance type method, a resistance film method, a surface acoustic wave (SAW) method, an infrared method, an optical imaging method, a dispersive signal technology, and an acoustic pulse recognition method, etc.

The touch sensor panel 100 for detecting where the touch has occurred in the touch input device 1000 according to the embodiment of the present invention may be positioned outside or inside a display module 200.

The display module of the touch input device 1000 according to the embodiment of the present invention may be a display panel included in a liquid crystal display (LCD), a plasma display panel (PDP), an organic light emitting diode (OLED), etc. Accordingly, a user may perform the input operation by touching the touch surface while visually identifying an image displayed on the display panel. Here, the display module 200 may include a control circuit which receives an input from an application processor (AP) or a central processing unit (CPU) on a main board for the operation of the touch input device 1000 and displays the contents that the user wants on the display panel. The control circuit may be mounted on a second printed circuit board (hereafter, referred to as a second PCB) (210) in FIGS. 15*a* to 17*c*. Here, the control circuit for the operation of the display module 200 may include a display panel control IC, a graphic controller IC, and a circuit required to operate other display panels 200.

FIGS. 2*a*, 2*b* and 2*c* are conceptual views showing a relative position of the touch sensor panel with respect to the display module in the touch input device according to the embodiment of the present invention. While FIGS. 2*a* to 2*c* show an LCD panel as a display panel, this is just an example. Any display panel may be applied to the touch input device 1000 according to the embodiment of the present invention.

In this specification, the reference numeral 200 designates the display panel. Also, in FIG. 2 and the description of FIG. 2, the reference numeral 200 may designate not only the display module but also the display panel. As shown in FIG. 2, the LCD panel may include a liquid crystal layer 250 including a liquid crystal cell, a first glass layer 261 and a second glass layer 262 which are disposed on both sides of the liquid crystal layer 250 and include electrodes, a first polarizer layer 271 formed on a side of the first glass layer 261 in a direction facing the liquid crystal layer 250, and a second polarizer layer 272 formed on a side of the second glass layer 262 in the direction facing the liquid crystal layer 250. It is clear to those skilled in the art that the LCD panel may further include other configurations for the purpose of performing the displaying function and may be transformed.

FIG. 2*a* shows that the touch sensor panel 100 of the touch input device 1000 is disposed outside the display module 200. The touch surface of the touch input device 1000 may be the surface of the touch sensor panel 100. In FIG. 2*a*, the top surface of the touch sensor panel 100 is able to function as the touch surface. Also, according to the embodiment, the touch surface of the touch input device 1000 may be the outer surface of the display module 200. In FIG. 2*a*, the bottom surface of the second polarizer layer 272 of the display module 200 is able to function as the touch surface. Here, in order to protect the display module 200, the bottom surface of the display module 200 may be covered with a cover layer (not shown) like glass.

FIGS. 2*b* and 2*c* show that the touch sensor panel 100 of the touch input device 1000 is disposed inside the display panel 200. Here, in FIG. 2*b*, the touch sensor panel 100 for detecting the touch position is disposed between the first glass layer 261 and the first polarizer layer 271. Here, the touch surface of the touch input device 1000 is the outer surface of the display module 200. The top surface or bottom surface of the display module 200 in FIG. 2*b* may be the touch surface. FIG. 2*c* shows that the touch sensor panel 100 for detecting the touch position is included in the liquid crystal layer 250. Here, the touch surface of the touch input device 1000 is the outer surface of the display module 200. The top surface or bottom surface of the display module 200 in FIG. 2*c* may be the touch surface. In FIGS. 2*b* and 2*c*, the top surface or bottom surface of the display module 200, which can be the touch surface, may be covered with a cover layer (not shown) like glass.

In the foregoing, it has been described that whether or not the touch occurs on the touch sensor panel 100 according to the embodiment of the present invention and/or the touch position are detected. Additionally, as described above, through use of the touch sensor panel 100 according to the embodiment of the present, it is possible to detect the magnitude of the touch pressure together with or separately from whether the touch has occurred or not and/or the touch position. A principle of detecting the magnitude of the pressure of the touch on the touch sensor panel 100 in the touch input device 1000 according to the embodiment of the present invention will be described in detail with regard to FIGS. 3 to 5.

FIG. 3 is a cross sectional view of a capacitive touch sensor panel included in a touch input device according to a first embodiment of the present invention. As shown in FIG. 3, the capacitive touch sensor panel 100 included in the touch input device according to the first embodiment of the present invention may include a plurality of first electrodes 10 formed on a first insulation layer 10a, a plurality of second electrodes 20 formed on a second insulation layer 20a, and a spacer 30 which leaves a space between the first electrode 10 and the second electrode 20. One of the first electrode 10 and the second electrode 20 may be the drive electrode TX which has been described with reference to FIG. 1, and the other may be the receiving electrode RX.

The touch sensor panel 100 included in the touch input device according to the embodiment of the present invention may convert the change of the capacitance between the first electrode 10 and the second electrode 20 into an appropriate electrical signal and output.

Here, as shown in FIG. 3, the first electrode 10 may be arranged on the first insulation layer 10a, and the second electrode 20 may be arranged on the second insulation layer 20a. The first electrode 10 and the second electrode 20 may be arranged in the same direction relatively with respect to the first insulation layer 10a and the second insulation layer 20a respectively. The first insulation layer 10a and/or the second insulation layer 20a may be composed of a thin transparent film made of a plastic material such as polyethylene terephthalate (PET).

As shown in FIG. 3, the touch sensor panel 100 included in the touch input device according to the embodiment of the present invention may further include a fourth insulation layer 50 attached to the second electrode 20 by mean of an adhesive layer 40. The fourth insulation layer 50 may function as a touch surface of a user. This is just an example, and the touch surface of the touch sensor panel 100 may be any other surface capable of causing the change of the capacitance between the first electrode 10 and the second electrode 20 when the touch occurs. The touch surface may be, as described in FIG. 1, a 2-dimensional plane consisting of the first axis and the second axis. For the purpose of a normal operation of the capacitive touch sensor panel, it is preferable that the fourth insulation layer 50 should be made of a material having a uniform dielectric constant and have a uniform thickness. For example, the fourth insulation layer 50 may be made of a material like polyethylene terephthalate (PET).

The adhesive layer 40 may be made of an optical clear adhesive (OCA), resin, a pressure sensitive adhesive, or an ultraviolet light cured adhesive, in such a manner as that the second electrode 20 and the fourth insulation layer 50 are adhered to each other.

In order that it is possible to detect the magnitude of the touch pressure as well as whether the touch occurs on the touch sensor panel or not and the touch position by detecting the change of the capacitance between the first electrode 10 and the second electrode 20, the touch sensor panel 100 included in the touch input device according to the embodiment of the present invention may include a spacer layer 30 which leaves a space between the first electrode 10 and the second insulation layer 20a.

As shown in FIG. 3, in the embodiment of the present invention, the spacer layer 30 may be formed by means of a double adhesive tape (DAT) 31 of which one side is adhered to the first electrode 10 and the other side is adhered to the second insulation layer 20a. That is, the area of the first electrode 10 and the area of the second insulation layer 20a are overlapped with each other. Here, the first electrode 10 and the second insulation layer 20a are adhered to each other by adhering the edge portions of the first electrode 10 and the second insulation layer 20a through use of the DAT 31. The rest portions of the first electrode 10 and the second insulation layer 20a may be spaced apart from each other by a predetermined distance.

In the embodiment of the present invention, the spacer layer 30 may be filled with a dielectric substance. When spacer layer 30 is filled with a dielectric substance, the optical characteristics and sensitivity characteristics thereof can be improved. When an electric field is applied to the dielectric substance, the dielectric substance does not generate direct current while generating an electric polarization. Therefore, when a voltage is applied to the first electrode 10 and the second electrode 20, a capacitance may be formed between the first electrode 10 and the second electrode 20. In the embodiment of the present invention, the dielectric substance may include open cell foam, gel or lightly linked polymer. In the embodiment of the present invention, for example, the spacer layer 30 may be filled with air.

In the embodiment of the present invention, the spacer layer 30 may be filled with an adhesive material. Here, the spacer layer 30 filled with an adhesive material not only maintains the adhesion between the first electrode 10 and the second insulation layer 20a, but functions as a dielectric substance. In the embodiment of the present invention, the adhesive material may include acrylic copolymer or silicon deformable polymer. When the spacer layer 30 is filled with the adhesive material, the double adhesive tape (DAT) 31 shown in FIG. 3 may be omitted.

As shown in FIG. 3, a plurality of dot spacers 32 may be included in the spacer layer 30. For instance, the plurality of dot spacers 32 may be formed on the first electrode 10 and may be made of a material such as nonconductive polyester. Also, the plurality of dot spacers 32 may be formed on the first insulation layer 10a without the first electrode 10 formed thereon.

FIG. 4 shows a state where pressure is applied to the touch sensor panel 100 included in the touch input device according to the first embodiment of the present invention. FIG. 4 shows that a touch occurs on the touch sensor panel 100 by a part of a body, etc. For brevity of description, FIG. 4 shows only the first electrode 10, the second electrode 20, the first insulation layer 10a, the second insulation layer 20a, and the spacer layer 30. In FIG. 4, an external pressure by an object touching the touch sensor panel 100 is indicated by 60.

While FIG. 4 shows that the external pressure 60 is applied to the second electrode 20, the external pressure 60 may be applied to the first electrode 10 in accordance with the embodiment. Therefore, it is necessary that at least one pair of both the first electrode 10 and the first insulation layer 10a and both the second electrode 20 and the second insulation layer 20a should have elasticity. Hereinafter, the embodiment of the present invention will be described by assuming that the external pressure 60 is applied to the second electrode 20.

As shown in FIG. 4, when the external pressure 60 is applied to the touch sensor panel 100, the second electrode 20 and the second insulation layer 20a are concavely bent toward the first electrode 10 in response to the external pressure 60. Here, in order to generate the capacitance between the second electrode 20 and the first electrode 10, it is necessary to prevent a short-circuit from occurring between the second electrode 20 and the first electrode 10. Here, in the embodiment of the present invention, the second insulation layer 20a prevents the first electrode 10 and the second electrode 20 from being short-circuited. As shown in FIG. 4, the spacer layer 30 includes the dot spacer 32, so that, when the external pressure 60 is applied to the touch sensor panel 100, the pressed area of the spacer layer 30 can be prevented from increasing, and when the external pressure 60 is removed, a restoring force by which the spacer layer 30 returns to its original shape can be improved. The size and number of the dot spacers 32 included in the spacer layer 30 may be determined in order to achieve the same purpose.

Here, the capacitance between the first electrode 10 and the second electrode 20 may change according to the change of a distance between the first electrode 10 and the second electrode 20. In the embodiment of the present invention, the magnitude of the external pressure 60 can be detected by the change of the capacitance between the first electrode 10 and the second electrode 20. In other words, the greater the external pressure 60 is, the smaller the distance between the first electrode 10 and the second electrode 20 is. As a result, the capacitance change amount may become larger. Likewise, the less the external pressure 60 is, the less the amount by which the distance between the first electrode 10 and the second electrode 20 is reduced. Here, the magnitude of the external pressure 60 may be indicated in a downward direction, that is, in a direction perpendicular and orthogonal to a horizontal plane.

FIG. 5a shows a first example of patterns of the first electrode and the second electrode of the touch sensor panel included in the touch input device according to the first embodiment of the present invention. The touch sensor panel 100 including the first example of the patterns of the electrodes of the present invention senses the change of the capacitance between the first electrode 10 and the second electrode 20, thereby detecting whether the touch occurs on the touch sensor panel 100 or not, the touch position and/or the magnitude of the touch pressure.

As shown in FIG. 5a, the first electrode 10 and the second electrode 20 may be arranged to cross each other. The first electrode 10 may include a plurality of first electrodes 11, 12, 13, and 14 which extend in the first axial direction. The second electrode 20 may include a plurality of second electrodes 21, 22, 23, and 24 which extend in the second axial direction crossing the first axial direction. Hereinafter, for convenience of description, the plurality of first electrodes 11, 12, 13, and 14 may be commonly designated as the first electrode 10. Similarly, the plurality of second electrodes 21, 22, 23, and 24 may be commonly designated as the second electrode 20.

Though FIG. 5a and the following figures show that the first axis and the second axis are orthogonal to each other, this is just an example. It is enough as long as the first axis and the second axis cross each other, and the first axis and the second axis are not necessarily orthogonal to each other. Hereinafter, for convenience of description, FIG. 5a will be divided into the top, bottom, right and left parts.

Here, a predetermined capacitance (indicated by a reference number of 101 in FIG. 1), that is, a value of a capacitance, is generated at each crossing of the first electrode 10 and the second electrode 20. When a part of a body approaches the crossing, the value of the capacitance may be changed.

In the first example of the patterns of the electrodes of the present invention, the first electrode 10 may be a driving line to which the drive signal is applied, and the second electrode 20 may be a receiving line which receives a drive signal coupled by the capacitance 101 between the first electrode 10 and the second electrode 20. The capacitance between the first electrode 10 and the second electrode 20 may change by the touch of a part of a body, etc. The touch input device senses such a change of the electrical characteristic, thereby detecting whether the body touch occurs or not and/or the position of the touch. In other words, in the 2-dimensional plane consisting of the first axis and the second axis, it is possible to detect whether or not the touch occurs on the touch sensor panel 100 and/or the position of the touch.

FIG. 5b shows separately the pattern of the first electrode shown in FIG. 5a. As shown in FIG. 5b, the first example of the pattern of the first electrode 10 of the present invention may include the plurality of first electrodes 11, 12, 13, and 14 which extend in the first axial direction. Although only four first electrodes 11, 12, 13, and 14 are shown in the drawing, it is apparent that another number of the first electrodes can be included. Here, when the touch occurs on the touch sensor panel 100, a signal from the first electrodes 11, 12, 13, and 14 is detected, and thus, the second axial direction position of the touch can be detected.

The width of each of the first electrodes 10 may be greater than that of the second electrode 20. This intends to block the capacitance change caused by a voltage used to drive a display like a liquid crystal display (LCD) which is generally provided on one side of the first electrode 10 opposite to the second electrode 20. For example, the first electrode 10 may function as a shielding layer.

FIG. 5c shows separately the pattern of the second electrode shown in FIG. 5a. As shown in FIG. 5c, the first example of the pattern of the second electrode 20 of the present invention may include the plurality of second electrodes 21, 22, 23, and 24 which extend in the second axial direction. Although only four second electrodes 21, 22, 23, and 24 are shown in the drawing, it is apparent that another number of the second electrodes can be included. Here, when the touch occurs on the touch sensor panel, a signal from the second electrodes 21, 22, 23, and 24 is detected, and thus, the first axial direction position of the touch can be detected.

In the foregoing, it has been described that whether or not the touch occurs on the touch sensor panel including the first example of the patterns of the electrodes of the present invention and/or the touch position are detected. Additionally, as described above, the touch sensor panel including the first example of the patterns of the electrodes of the present invention is able to detect the magnitude of the touch pressure together with or separately from whether the touch has occurred or not and/or the touch position. Hereinafter, a principle of detecting the magnitude of the pressure of the touch on the touch sensor panel including the first example of the patterns of the electrodes of the present invention will be described.

FIG. 5d is an enlarged view of a part "A" of FIG. 5a. The part "A" of FIG. 5a means one of overlapping areas of the first electrode 10 and the second electrode 20. In FIG. 5d, the width of the part "A" is represented by "W", and the length width of the part "A" is represented by "L". A length by which the first electrode 10 is spaced apart from the second electrode 20 is represented by a height "d" for convenience. Here, in the part "A", a mutual capacitance C between the first electrode 10 and the second electrode 20 may be calculated as C=εo εr WL/d. Here, "εo" represents a vacuum permittivity, and "εr" represents a relative permittivity of a material filled between the first electrode 10 and the second electrode 20.

When it is assumed that "W" and "L" are 4 mm and "d" is 0.15 mm and "εr" is 4, the mutual capacitance between the first electrode 10 and the second electrode 20 is calculated as about 3.73 pF. Here, when "d" is decreased by 0.1 mm due to the application of the pressure to the touch sensor panel, the mutual capacitance between the first electrode 10 and the second electrode 20 is increased by 5.6 pF.

Therefore, the change amount of the capacitance between the first electrode 10 and the second electrode 20 is measured at the time of touching the touch sensor panel including the first example of the patterns of the electrodes of the present invention, so that the magnitude of the touch pressure can be detected through the change of the distance between the first electrode 10 and the second electrode 20.

Here, a base mutual capacitance between the first electrode 10 and the second electrode 20 and/or a change rate of the mutual capacitance between the first electrode 10 and the second electrode 20 can be controlled by changing the thickness of the spacer layer 30, a medium filling the spacer layer 30, the degree of elasticity of the medium, and the patterns of the first electrode 10 and/or the second electrode 20. The base mutual capacitance corresponds to a mutual capacitance between the first electrode 10 and the second electrode 20 when no touch occurs on the touch sensor panel.

FIG. 6a shows a second example of patterns of a first electrode, a second electrode and a third electrode of the touch sensor panel according to the first embodiment of the present invention. Here, the second electrode 20 and a third electrode 70 may be on the same plane in the second insulation layer 20a. In the touch sensor panel including the second example of the patterns of the electrodes of the present invention, the first electrode 10 and the second electrode 20 are configured to sense the magnitude of the touch on the touch sensor panel, and the second electrode 20 and the third electrode 70 are configured to detect the position of the touch on the touch sensor panel. The second example of the patterns of the electrodes of the present invention is remarkably similar to the first example of the patterns of the electrodes of the present invention. Hereinafter, therefore, the following description will focus on the differences between the two examples.

The pattern shown in FIG. 5b may be applied to the first electrode 10. However, only in relation to the second electrode 20, the first electrode 10 of the second example of the patterns of the electrodes of the present invention may be configured to be used to detect the magnitude of the touch pressure by detecting the change of the capacitance between the first electrode 10 and the second electrode 20. In the second example of the patterns of the electrodes, during the period of time when the second electrode 20 and the third electrode 70 detect whether the touch occurs on the touch sensor panel or not and/or the touch position, a ground voltage is applied to the first electrode 10. As a result, the first electrode 10 is still able to function as a shielding layer.

In FIG. 6a, the first electrode 10 may still function as a drive electrode in the detection of the magnitude of the pressure, and the second electrode 20 may function as a receiving electrode in the detection of the magnitude of the pressure. In the detection of the touch position, the third electrode 70 may function as a drive electrode, and the second electrode 20 may still function as a receiving electrode. In this case, the touch detection device performs time-sharing, and then applies a drive signal to the first electrode 10 and receives a receiving signal from the second electrode 20 in a first time interval. Thus, the touch detection device can detect the magnitude of the touch pressure. The touch detection device applies a drive signal to the third electrode 70 and receives a receiving signal from the second electrode 20 in a second time interval different from the first time interval, and thus, can detect the touch position. A ground voltage may be applied to the first electrode 10 in the second time interval.

Also, in FIG. 6a, the second electrode 20 can function as the drive electrode TX in both the detection of the magnitude of the touch pressure and the detection of the touch position. The first electrode 10 can function as a receiving electrode for detecting the magnitude of the touch pressure, and the third electrode 70 can function as a receiving electrode for detecting the touch position, respectively. Here, the touch detection device applies a drive signal to the second electrode 20 and simultaneously receives a first receiving signal from the first electrode 10, and then, detects the magnitude of the touch pressure. The touch detection device receives a second receiving signal from the third electrode 70, and then, detects the touch position. Even in such a case, the touch detection device performs time-sharing, and then receives the first sensing signal from the first electrode 10 in the first time interval, thereby detecting the magnitude of the touch pressure, and receives the second sensing signal from the third electrode 70 in the second time interval different from the first time interval, thereby detecting the touch position.

FIG. 6b shows separately the patterns of the second and third electrodes shown in FIG. 6a. As shown in FIG. 6b, a touch detection area including a plurality of sensing areas "B" arranged in a matrix consisting of M number of columns extending in the second axial direction and N number of rows extending in the first axial direction (M×N, M and N are natural numbers) may be included. While FIGS. 6a and 6b show that only four columns and four rows are included, this is just an example. Any number of rows and columns may be included.

Hereinafter, a case where the third electrode 70 is a drive electrode and the second electrode 20 is a receiving electrode will be taken as an example in the detection of the touch position.

Here, each of the plurality of sensing areas "B" includes a second electrode 21a and the third electrode 71 which are mutually exclusive. The third electrode 71 may be located on one side in the second axial direction relatively with respect to the second electrode 21a within the sensing area "B". The second electrode 21a may be located on the other side in the second axial direction. FIG. 6b shows that the second electrode 21a is located on the right side of the sensing area "B" and the third electrode 71 is located on the left side of the sensing area "B".

FIG. 6b shows that the shapes of all of the patterns in the sensing area "B" are the same as each other. The third electrode 70 extends in the form of a bar in the same row in the first axial direction. Therefore, when the touch occurs on the touch sensor panel, the touch position in the second axial direction can be detected by processing the signal from the third electrode 70.

It can be seen that the second electrode 20 has a divided quadrangular pattern for each sensing area "B". However, each divided second electrode 21a included in the sensing area "B" is connected to a conductive trace 211. Here, as shown in FIG. 6b, it can be understood that the divided second electrodes 21a, 21b, 21c, and 21d included in the same column are electrically connected to each other through the conductive trace. It can be found that the divided second electrodes 21a, 22a, 23a, and 24a included in the different columns are electrically insulated from each other. Therefore, when the touch occurs on the touch sensor panel, the touch position in the first axial direction can be detected by processing the signal from the second electrode 20.

FIG. 6c shows a third example of patterns of a first electrode, a second electrode and a third electrode of the touch sensor panel included in the touch input device according to the first embodiment of the present invention. The third example of the patterns of the electrodes of the present invention is remarkably similar to the second example of the patterns of the electrodes of the present invention. Only the patterns of the second and third electrodes show difference. Hereinafter, therefore, the following description will focus on the differences between the third example and the second example.

As shown in FIG. 6c, a touch detection area including a plurality of sensing areas "C", "D", and "E" arranged in a matrix consisting of M number of columns extending in the second axial direction and N number of rows extending in the first axial direction (M×N, M and N are natural numbers) may be included.

In the third example of the patterns of the electrodes of the present invention, each of the plurality of sensing areas "C", "D", and "E" includes the third electrodes 72 and 73 and the second electrodes 22b, 22c, and 23b which are mutually exclusive. In at least one sensing area "C" among the plurality of the sensing areas, the third electrode 72 may be located on one side in the first axial direction relatively with respect to the second electrode 22b, and the second electrode may be located on the other side. In at least another one sensing area "E" located in the same row as that of the at least one sensing area "C" among the plurality of the sensing areas, the third electrode 72 may be located on the other side in the first axial direction relatively with respect to the second electrode 23b, and the second electrode 23b may be located on the one side. In the above description, the one side may represent the left side of FIG. 6c, and the other side may represent the right side of FIG. 6c.

In the third example of the patterns of the electrodes of the present invention, the adjacent sensing area "E" located in the same row (the second row) as that of any one sensing area "C" among the plurality of sensing areas "C", "D", and "E" has a shape inverted with respect to the one sensing area "C" on the basis of a second axial direction center line C1 of the one sensing area "C". Here, the center line C1 is a straight line which extends from the second axial direction center inside the sensing area "C" in the first axial direction. The relationships between the shapes of the sensing areas "C", "D", and "E" can be applied to all of the two adjacent sensing areas in the same row.

One end of the third electrode 72 of the one sensing area "C" may extend to one end of the third electrode 72 of the adjacent sensing area "E". Consequently, as shown in FIG. 6c, in the touch sensor panel including the third example of the patterns of the electrodes of the present invention, it is discovered that that the third electrode 72 extends in zigzags from the top to the bottom in the same row. That is, the first electrodes of the plurality of sensing areas included in the first row extend in zigzags and connected to each other. This is applied in the same manner to the second to fourth rows. The third electrodes included in each row are connected to each other. The third electrodes included in mutually different rows are not electrically connected to each other.

As a result, when the touch occurs on the touch sensor panel, the second axial direction position of the touch can be detected by detecting the signal from the third electrode.

In the third example of the patterns of the electrodes of the present invention, the sensing areas "C" and "D" included in two adjacent rows among the N number of rows may have a symmetrical shape with respect to the first axial direction center line between the two rows (the second row and the third row). For example, the sensing area "C" and the sensing area "D" are located in the second row and the third row respectively. The positions and shapes of the third electrode 73 and the second electrode 22c in the sensing area "D" are symmetrical to the positions and shapes of the third electrode 72 and the second electrode 22b in the sensing area "D" with respect to the center line between the sensing area "C" and the sensing area "D". Here, the first axial direction center line between the two rows is a straight line which extends between the second row and the third row in the first axial direction. The relationships between the shapes of the sensing areas can be applied to all of the two adjacent sensing areas in the adjacent row.

As shown in FIGS. 6c and 6d, the second electrodes 22b, 22c, and 23b are connected to the conductive traces 211C, 211D, and 211E in the sensing areas "C", "D", and "E" respectively. Here, as shown in FIG. 6c, it can be understood that the divided second electrodes 22a, 22b, 22c, and 22d included in the same column are electrically connected to each other through the conductive trace. It can be found that the divided second electrodes 21a, 22a, 23a, and 24a included in the different columns are electrically insulated from each other. Therefore, when the touch occurs on the touch sensor panel, the touch position in the first axial direction can be detected by processing the signal from the second electrode 20.

FIGS. 6a to 6d show the electrode pattern for the example in which the touch sensor panel further includes the third electrode 70 located in the same layer as the layer in which the second electrode 20 is located. However, this is just an example. Together with the pattern shown in FIGS. 6a to 6d, so long as the third electrode 70 and the second electrode 20 are located in the same layer, and then the position of the touch on the touch sensor panel can be detected and the magnitude of the touch pressure can be detected by the first and second electrodes 10 and 20, any pattern may be used.

FIG. 7 is a schematic view of a capacitive touch sensor panel included in a touch input device according to a second embodiment of the present invention. The capacitive touch sensor panel 100 included in the touch input device according to the second embodiment shown in FIG. 7 is different from the touch sensor panel 100 included in the touch input device according to the first embodiment shown in FIG. 3 in that the capacitive touch sensor panel 100 included in the touch input device according to the second embodiment further includes a third insulation layer 70a and the third electrode 70 is formed on the third insulation layer 70a. Here, the third insulation layer 70a may be adhered to the second electrode 20 by means of an additional adhesive layer 80.

In the second embodiment of the present invention, the magnitude of the pressure of the touch on the touch sensor panel 100 can be detected by detecting the change of the capacitance change between the first electrode 10 and the second electrode 20. Also, it is possible to detect the position of the touch on the plane consisting of the first axis and the second axis of the touch sensor panel 100 by detecting the change of the capacitance change between the first electrode 10 and the second electrode 20.

The third electrode 70 of the touch sensor panel 100 included in the touch input device according to the second embodiment of the present invention performs the same function as that of the third electrode 70 of the foregoing second example and third example described in FIGS. 6a to 6d of the present invention. However, in the second embodiment of the present invention, the third electrode 70 and the second electrode 20 are formed in different layers. Hereinafter, repetitive descriptions thereof will be omitted.

FIG. 8a shows a fourth example of patterns of the first electrode, the second electrode and the third electrode of the touch sensor panel included in the touch input device according to the second embodiment of the present invention. In FIG. 8a, the first electrode 10, the second electrode 20, and the third electrode 70 may be implemented in different layers.

FIG. 8b shows separately the pattern of the second electrode of FIG. 8a. The second electrode 20 may include, as shown in FIG. 5b, the plurality of second electrodes 21, 22, 23, and 24 which extend in the second axial direction. In FIGS. 8a and 8b, each of the plurality of second electrodes 21, 22, 23, and 24 has a rhombus shape, and the plurality of rhombus shapes are connected to each other in the second axial direction. This is just an example. It is apparent that the second electrode 20 shown in FIG. 5b can be applied. Here, the plurality of rhombus shapes should be insulated from each other in the first axial direction.

FIG. 8c shows separately the pattern of the third electrode of FIG. 8a. The third electrode 70 may include the plurality of third electrodes 71, 72, 73, and 74 which extend in the first axial direction. In FIGS. 8a and 8c, each of the plurality of third electrodes 71, 72, 73, and 74 has a rhombus shape, and the plurality of rhombus shapes are connected to each other in the first axial direction. This is just an example. The pattern of the first electrode 10 shown in FIG. 5c can be applied. Here, the plurality of rhombus shapes should be insulated from each other in the second axial direction.

The forms of the patterns of the first, second, and third electrodes described above are just examples. Therefore, it is apparent that various forms of the patterns of the first, second, and third electrodes can be applied within the scope of the present invention.

With reference to FIGS. 3 to 5d, the foregoing has described the examples in which the first electrode 10 and the second electrode 20 are formed in different layers and are used to detect the position of the touch on the touch sensor panel 100 and/or the magnitude of the touch pressure.

With reference to FIGS. 6a to 6d, the foregoing has described the examples in which the first electrode 10 and the second electrode 20 are formed in different layers and are configured to detect the magnitude of the touch pressure, and the third electrode 70 located in the same layer as the layer in which the second electrode 20 is located detects the position of the touch on the touch sensor panel 100.

Also, with reference to FIGS. 7 to 8c, the foregoing has described the examples in which the first electrode 10 and the second electrode 20 are formed in different layers and are configured to detect the magnitude of the touch pressure, and the third electrode 70 formed in a layer different from the layer in which the second electrode 20 is formed detects the position of the touch on the touch sensor panel 100.

That is, the present specification has described the examples in which at least one electrode 10 or 20 is commonly used to detect the position of the touch and the magnitude of the touch pressure.

Though not shown in the drawings, a touch sensor panel 100 including a fifth example of patterns of the electrodes the present invention may include the first electrode 10 and the second electrode 20 which are, as shown in FIG. 3, formed in different layers and detect the magnitude of the touch pressure; and the third electrode 70 and a fourth electrode (not shown) which detect the position of the touch. In other words, in the touch sensor panel 100 including a fifth example of patterns of the electrodes of the present invention, the two electrodes (first electrode and second electrode) which detect the magnitude of the touch pressure and the two electrode (third electrode and fourth electrode) which detect the position of the touch may be formed separately from each other.

In the touch sensor panel 100 including a fifth example of patterns of the electrodes of the present invention, all of the first electrode 10 to the fourth electrode (not shown) may be formed in different layers. For example, in FIG. 7, the fourth electrode (not shown) formed on an additional insulation layer (not shown) may be further included between the third 70 and the adhesive layer 40.

In the touch sensor panel 100 including a fifth example of patterns of the electrodes of the present invention, it is also possible that the first electrode 10 to the third electrode 70 are formed in different layers, and the third electrode 70 and the fourth electrode are formed in the same layer.

In the fifth example of the present invention, since the third electrode 70 and the fourth electrode which detect the position of the touch perform their functions independently of the first electrode 10 and the second electrode 20, the third electrode 70 and the fourth electrode (not shown) may be configured independently of the first electrode 10 and the second electrode 20. For example, even when the first electrode 10 and the second electrode 20 cross each other in the first axial direction and the second axial direction, the third electrode 70 and the fourth electrode do not necessarily cross each other in the first axial direction and the second axial direction. If the third electrode 70 and the fourth electrode are on the same plane consisting of the first axis and the second axis, they may extend in any axial direction in which they cross each other. According to the example, the third electrode 70 may extend in one of the first and second axial directions, and the fourth electrode may extend in the other of the first and second axial directions.

Also, apart from the touch sensor panel 100, it is possible to detect the magnitude of the touch pressure by further including the pressure detection module which detects the touch pressure.

FIG. 9 is a cross sectional view of the touch input device configured to detect the touch position and touch pressure in accordance with a third embodiment of the present invention.

In the touch input device 1000 including the display module 200, the touch sensor panel 100 and the pressure detection module 400 which detect the touch position may be attached on the front side of the display module 200, As a result, the display screen of the display module 200 can be protected and the touch detection sensitivity of the touch sensor panel 100 can be improved.

Here, the pressure detection module 400 may be operated apart from the touch sensor panel 100 which detects the touch position. For example, the pressure detection module 400 may be configured to detect only the touch pressure independently of the touch sensor panel 100 which detects the touch position. Also, the pressure detection module 400 may be configured to be coupled to the touch sensor panel 100 which detects the touch position and to detect the touch pressure. For example, at least one of the drive electrode TX and the receiving electrode RX included in the touch sensor panel 100 which detects the touch position may be used to detect the touch pressure.

FIG. 9 shows that the pressure detection module 400 is coupled to the touch sensor panel 100 and detects the touch pressure. In FIG. 2, the pressure detection module 400 includes a spacer layer 420 which leaves a space between the touch sensor panel 100 and the display module 200. The pressure detection module 400 may include a reference potential layer spaced from the touch sensor panel 100 by the spacer layer 420. Here, the display module 200 may function as the reference potential layer.

The reference potential layer may have any potential which causes the change of the capacitance 101 generated between the drive electrode TX and the receiving electrode RX. For instance, the reference potential layer may be a ground layer having a ground potential. The reference potential layer may be the ground layer of the display module 200. Here, the reference potential layer may have a parallel plane with the two-dimensional plane of the display module 200.

As shown in FIG. 9, the touch sensor panel 100 is disposed apart from the display module 200, i.e., the reference potential layer. Here, depending on a method for adhering the touch sensor panel 100 to the display module 200, the spacer layer 420 may be implemented in the form of an air gap between the touch sensor panel 100 and the display module 200.

Here, a double adhesive tape (DAT) 430 may be used to fix the touch sensor panel 100 and the display module 200. For example, the areas the touch sensor panel 100 and the display module 200 are overlapped with each other. The touch sensor panel 100 and the display module 200 are adhered to each other by adhering the edge portions of the touch sensor panel 100 and the display module 200 through use of the DAT 430. The rest portions of the touch sensor panel 100 and the display module 200 may be spaced apart from each other by a predetermined distance "d".

In general, even when the touch surface is touched without bending the touch sensor panel 100, the capacitance (Cm) 101 between the drive electrode TX and the receiving electrode RX is changed. That is, when the touch occurs on the touch sensor panel 100, the mutual capacitance (Cm) 101 may become smaller than a base mutual capacitance. This is because, when the conductive object like a finger approaches close to the touch sensor panel 100, the object functions as the ground GND, and then a fringing capacitance of the mutual capacitance (Cm) 101 is absorbed in the object. The base mutual capacitance is the value of the mutual capacitance between the drive electrode TX and the receiving electrode RX when there is no touch on the touch sensor panel 100.

When the object touches the top surface, i.e., the touch surface of the touch sensor panel 100 and a pressure is applied to the top surface, the touch sensor panel 100 may be bent. Here, the value of the mutual capacitance (Cm) 101 between the drive electrode TX and the receiving electrode RX may be more reduced. This is because the bend of the touch sensor panel 100 causes the distance between the touch sensor panel 100 and the reference potential layer to be reduced from "d" to "d'", so that the fringing capacitance of the mutual capacitance (Cm) 101 is absorbed in the reference potential layer as well as in the object. When a nonconductive object touches, the change of the mutual capacitance (Cm) 101 is simply caused by only the change of the distance "d-d'" between the touch sensor panel 100 and the reference potential layer.

As described above, the touch input device 1000 is configured to include the touch sensor panel 100 and the pressure detection module 400 on the display module 200, so that not only the touch position but also the touch pressure can be simultaneously detected.

However, as shown in FIG. 9, when the pressure detection module 400 as well as the touch sensor panel 100 is disposed on the display module 200, the display properties of the display module is deteriorated. Particularly, when the air gap 420 is included on the display module 200, the visibility and optical transmittance of the display module may be lowered.

Accordingly, in order to prevent such problems, the air gap is not disposed between the display module 200 and the touch sensor panel 100 for detecting the touch position. Instead, the touch sensor panel 100 and the display module 200 can be completely laminated by means of an adhesive like an optically clear adhesive (OCA).

FIG. 10 is a cross sectional view of the touch input device according to a fourth embodiment of the present invention. In the touch input device 1000 according to the fourth embodiment of the present invention, the complete lamination is made by an adhesive between the touch sensor panel 100 and the display module 200 for detecting the touch position. As a result, the display color clarity, visibility and optical transmittance of the display module 200, which can be recognized through the touch surface of the touch sensor panel 100, can be improved.

In FIGS. 10 and 11 and the description with reference to FIGS. 10 and 11, it is shown that as the touch input device 1000 according to the fourth embodiment of the present invention, the touch sensor panel 100 is laminated and attached on the display module 200 by means of an adhesive. However, the touch input device 1000 according to the fourth embodiment of the present invention may include, as shown in FIGS. 2b and 2c, that the touch sensor panel 100 is disposed inside the display module 200. More specifically, while FIGS. 10 and 11 show that the touch sensor panel 100 covers the display module 200, the touch input device 1000 which includes the touch sensor panel 100 disposed inside the display module 200 and includes the display module 200 covered with a cover layer like glass may be used as the fourth embodiment of the present invention.

The touch input device 1000 according to the embodiment of the present invention may include an electronic device including the touch screen, for example, a cell phone, a personal data assistant (PDA), a smart phone, a tablet personal computer, an MP3 player, a laptop computer, etc.

In the touch input device 1000 according to the embodiment of the present invention, a substrate 300, together with an outermost cover 320 of the touch input device 1000, functions as, for example, a housing which surrounds a mounting space 310, etc., where the circuit board and/or battery for operation of the touch input device 1000 are placed. Here, the circuit board for operation of the touch input device 1000 may be a main board. A central processing unit (CPU), an application processor (AP) or the like may be mounted on the circuit board. Due to the substrate 300, the display module 200 is separated from the circuit board and/or battery for operation of the touch input device 1000. Due to the substrate 300, electrical noise generated from the display module 200 can be blocked.

The touch sensor panel 100 or front cover layer of the touch input device 1000 may be formed wider than the display module 200, the substrate 300, and the mounting space 310. As a result, the cover 320 is formed such that the cover 320, together with the touch sensor panel 100, surrounds the display module 200, the substrate 300, and the mounting space 310.

The touch input device 1000 according to the fourth embodiment of the present may detect the touch position through the touch sensor panel 100 and may detect the touch pressure by disposing the pressure detection module 400 between the display module 200 and the substrate 300. Here, the touch sensor panel 100 may be disposed inside or outside the display module 200. The pressure detection module 400 is formed to include, for example, the spacer layer 420 consisting of the air gap. This will be described in detail with reference to FIGS. 11 to 13b. The spacer layer 420 may be made of an impact absorbing material in accordance with the embodiment. The spacer layer 420 may be filled with a dielectric material in accordance with the embodiment.

FIG. 11 is a perspective view of the touch input device according to the fourth embodiment of the present invention. As shown in FIG. 11, in the touch input device 1000 according to the embodiment of the present, the pressure detection module 400 may include the spacer layer 420 which leaves a space between the display module 200 and the substrate 300 and may include electrodes 450 and 460 disposed within the spacer layer 420. Here, since the electrodes 450 and 460 are included in the rear side instead of in the front side of the display panel, the electrodes 450 and 460 may be made of an opaque material as well as a transparent material.

Here, the adhesive tape 440 with a predetermined thickness may be formed along the border of the upper portion of the substrate 300 in order to maintain the spacer layer 420. While FIG. 11 shows the adhesive tape 440 is formed on the entire border (e.g., four sides of the quadrangle) of the substrate 300, the adhesive tape 440 may be formed only on at least some (e.g., three sides of the quadrangle) of the border of the substrate 300. According to the embodiment, the adhesive tape 440 may be formed on the top surface of the substrate 300 or on the bottom surface of the display module 200. The adhesive tape 440 may be a conductive tape in order that the substrate 300 and the display module 200 have the same electric potential. The adhesive tape 440 may be a double adhesive tape. In the embodiment of the present invention, the adhesive tape 440 may be made of an inelastic material. In the embodiment of the present invention, when a pressure is applied to the display module 200, the display module 200 may be bent. Therefore, the magnitude of the touch pressure can be detected even though the adhesive tape 440 is not transformed by the pressure.

FIG. 12a is a cross sectional view of the touch input device including a first example of the pressure electrode pattern according to the fourth embodiment of the present invention. As shown in FIG. 12a, the electrodes 450 and 460 according to the first example of the pressure electrode pattern of the present invention may be formed within the spacer layer 420 and on the substrate 300.

The pressure electrode for detecting the pressure may include the first electrode 450 and the second electrode 460. Here, any one of the first and the second electrodes 450 and 460 may be a drive electrode and the other may be a receiving electrode. A driving signal is applied to the drive electrode, and a sensing signal may be obtained through the receiving electrode. When voltage is applied, the mutual capacitance may be generated between the first electrode 450 and the second electrode 460.

FIG. 12b is a cross sectional view showing a case where a pressure has been applied to the touch input device 1000 shown in FIG. 12a. The bottom surface of the display module 200 may have a ground potential so as to block the noise. When the pressure is applied to the surface of the touch sensor panel 100 by an object 500, the touch sensor panel 100 and the display module 200 may be bent. As a result, the distance "d" between the ground potential surface and the electrodes 450 and 460 may be decreased to "d'". In this case, due to the decrease of the distance "d", the fringing capacitance is absorbed in the bottom surface of the display module 200, so that the mutual capacitance between the first electrode 450 and the second electrode 460 may be reduced. Therefore, the magnitude of the touch pressure can be calculated by obtaining the reduction amount of the mutual capacitance from the sensing signal obtained through the receiving electrode.

In the touch input device 1000 according to the embodiment of the present invention, the display module 200 may be bent by the touch pressure. The display module 200 may be bent in such a manner as to show the biggest transformation at the touch position. When the display module 200 is bent according to the embodiment, a position showing the biggest transformation may not match the touch position. However, the display module 200 may be shown to be bent at least at the touch position. For example, when the touch position approaches close to the border, edge, etc., of the display module 200, the most bent position of the display module 200 may not match the touch position, however, the display module 200 may be shown to be bent at least at the touch position.

Here, the top surface of the substrate 300 may also have the ground potential in order to block the noise. Therefore, in order to prevent a short-circuit from occurring between the substrate 300 and the electrodes 450 and 460, the electrodes 450 and 460 may be formed on an insulation layer 470. FIG. 14 shows an attachment structure of the pressure electrode according the embodiment of the present invention. Referring to (a) of FIG. 14, the first insulation layer 470 is positioned on the substrate 300, and then the electrodes 450 and 460 are formed. Also, according to the embodiment, the first insulation layer 470 on which the electrodes 450 and 460 have been formed may be attached on the substrate 300. Also, the pressure electrode according to the embodiment may be formed by positioning a mask, which has a through-hole corresponding to the pressure electrode pattern, on the substrate 300 or on the first insulation layer 470 positioned on the substrate 300, and then by spraying a conductive material.

Also, when the bottom surface of the display module 200 has the ground potential, the electrodes 450 and 460 may be covered with an additional second insulation layer 471 in order to prevent a short-circuit from occurring between the display module 200 and the electrodes 450 and 460 positioned on the substrate 300. Also, the electrodes 450 and 460 formed on the first insulation layer 470 are covered with the additional second insulation layer 471 and then are integrally attached on the substrate 300, so that the pressure detection module 400 is formed.

The electrodes 450 and 460 attachment structure and method, which have been described with reference to (a) of FIG. 14, may be applied to the attachment of the electrodes 450 and 460 to the display module 200. The attachment of the electrodes 450 and 460 to the display module 200 will be described in more detail with reference to FIG. 12c.

Also, depending on the kind and/or implementation method of the touch input device 1000, the substrate 300 or the display module 200 on which the electrodes 450 and 460 are attached may not have the ground potential or may have a weak ground potential. In this case, the touch input device 1000 according to the embodiment of the present invention may further include a ground electrode (not shown) between the first insulation layer 470 and either the substrate 300 or the display module 200. According to the embodiment, another insulation layer (not shown) may be included between the ground electrode and either the substrate 300 or the display module 200. Here, the ground electrode (not shown) is able to prevent the size of the capacitance generated between the first electrode 450 and the second electrode 460, which are pressure electrodes, from increasing excessively.

The above-described method for forming and attaching electrodes 450 and 460 can be applied in the same manner to the following embodiments.

FIG. 12c is a cross sectional view of the touch input device including a second example of the pressure electrode pattern according to the fourth embodiment of the present invention. While the first example of the pressure electrode pattern shows that the electrodes 450 and 460 are formed on the substrate 300, the electrodes 450 and 460 can be formed on the bottom surface of the display module 200. Here, the substrate 300 may have the ground potential. Therefore, the distance "d" between the substrate 300 and the electrodes 450 and 460 is reduced by touching the touch surface of the touch sensor panel 100. Consequently, this may cause the change of the mutual capacitance between the first electrode 450 and the second electrode 460.

FIG. 12d shows the first example of the pressure electrode pattern of the present invention. FIG. 12d shows that the first electrode 450 and the second electrode 460 are formed on the substrate 300. The capacitance between the first electrode 450 and the second electrode 460 may be changed depending on the distance between the bottom surface of the display module 200 and the electrodes 450 and 460.

FIG. 12e shows the second example of the pressure electrode pattern of the present invention. FIG. 12e shows that the pressure electrode patterns 450 and 460 have been formed on the bottom surface of the display module 200.

FIGS. 12f to 12g show pressure electrode patterns 450 and 460 which can be applied to the embodiment of the present invention. When the magnitude of the touch pressure is detected as the mutual capacitance between the first electrode 450 and the second electrode 460 is changed, it is necessary to form the patterns of the first electrode 450 and the second electrode 460 so as to generate the range of the capacitance required to improve the detection accuracy. With the increase of a facing area or facing length of the first electrode 450 and the second electrode 460, the size of the capacitance that is generated may become larger. Therefore, the pattern can be designed by adjusting the size of the facing area, facing length and facing shape of the first electrode 450 and the second electrode 460 in accordance with the range of the necessary capacitance. FIGS. 12f and 12g show that the first electrode 450 and the second electrode 460 are formed in the same layer, and show that the pressure electrode is formed such that the facing length of the first electrode 450 and the second electrode 460 becomes relatively longer.

The first and second examples of the pressure electrode pattern show that the first electrode 450 and the second electrode 460 are formed in the same layer. However, it can be considered that the first electrode 450 and the second electrode 460 are formed in different layers in accordance with the example. It is shown in (b) of FIG. 14 that an attachment structure in which the first electrode 450 and the second electrode 460 are formed in different layers. As shown in (b) of FIG. 14, the first electrode 450 may be formed on the first insulation layer 470, and the second electrode 460 may be formed on the second insulation layer 471 positioned on the first electrode 450. According to the example, the second electrode 460 may be covered with a third insulation layer 472. Here, since the first electrode 450 and the second electrode 460 are disposed in different layers, they can be implemented so as to overlap each other. For example, the first electrode 450 and the second electrode 460 may be formed similarly to the pattern of the drive electrode TX and receiving electrode RX which are arranged in the form of M×N array and are included in the touch sensor panel 100 described with reference to FIG. 1. Here, M and N may be natural numbers greater than 1.

The first example of the pressure electrode pattern shows that the touch pressure is detected from the change of the mutual capacitance between the first electrode 450 and the second electrode 460. However, the electrodes 450 and 460 may be configured to include only any one of the first electrode 450 and the second electrode 460. In this case, it is possible to detect the magnitude of the touch pressure by detecting the change of the capacitance between the one pressure electrode and the ground layer (either the display module 200 or the substrate 300).

For instance, in FIG. 12a, the pressure electrode may be configured to include only the first electrode 450. Here, the magnitude of the touch pressure can be detected by the change of the capacitance between the first electrode 450 and the display module 200, which is caused by the distance change between the display module 200 and the first electrode 450. Since the distance "d" is reduced with the increase of the touch pressure, the capacitance between the display module 200 and the first electrode 450 may be increased with the increase of the touch pressure. This can be applied in the same manner to the example related to FIG. 12c. Here, the pressure electrode should not necessary have a comb teeth shape or a trident shape, which is required to improve the detection accuracy of the mutual capacitance change amount. The pressure electrode may have, as shown in FIG. 13b, a plate shape (e.g., quadrangular plate).

It is shown in (c) of FIG. 14 that an attachment structure in which the pressure electrode is formed to include only the first electrode 450. As shown in (c) of FIG. 14, the first electrode 450 may be formed on the first insulation layer 470 positioned on the substrate 300 or display module 200. Also, according to the example, the first electrode 450 may be covered with the second insulation layer 471.

FIG. 13a is a cross sectional view of the touch input device including a third example of the pressure electrode pattern according to the fourth embodiment of the present invention. The electrodes 450 and 460 according to the third example of the pressure electrode pattern may be formed within the spacer layer 420 and on the top surface of the substrate 300 and on the bottom surface of the display module 200.

The pressure electrode pattern for detecting the pressure may include the first electrode 450 and the second electrode 460. Here, any one of the first electrode 450 and the second electrode 460 may be formed on the substrate 300, and the other may be formed on the bottom surface of the display module 200. FIG. 13a shows that the first electrode 450 is formed on the substrate 300, and the second electrode 460 is formed on the bottom surface of the display module 200.

When the pressure is applied to the surface of the touch sensor panel 100 by the object 500, the touch sensor panel 100 and the display module 200 may be bent. As a result, the distance "d" between the first electrode 450 and the second electrode 460 may be reduced. In this case, the mutual capacitance between the first electrode 450 and the second electrode 460 may be increased with the reduction of the distance "d". Therefore, the magnitude of the touch pressure can be calculated by obtaining the increase amount of the mutual capacitance from the sensing signal obtained through the receiving electrode.

FIG. 13b shows the third example of the pressure electrode pattern of the present invention. FIG. 13b shows that the first electrode 450 is formed on the top surface of the substrate 300 and the second electrode 460 is formed on the bottom surface of the display module 200. As shown in FIG. 13b, since the electrodes 450 and 460 are formed in different layers, the electrodes 450 and 460 should not necessarily have a comb teeth shape or a trident shape unlike the first and second examples of the pressure electrode pattern. The electrodes 450 and 460 may have a plate shape (e.g., quadrangular plate).

It is shown in (d) of FIG. 14 that an attachment structure in which the first electrode 450 is attached on the substrate 300 and the second electrode 460 is attached to the display module 200. As shown in (d) of FIG. 14, the first electrode 450 may be positioned on the first insulation layer 470-2 formed on the substrate 300 and may be covered with the second insulation layer 471-2. Also, the second electrode 460 may be positioned on the first insulation layer 470-1 formed on the bottom surface of the display module 200 and may be covered with the second insulation layer 471-1.

As with the description related to (a) of FIG. 14, when substrate 300 or the display module 200 on which the electrodes 450 and 460 are attached may not have the ground potential or may have a weak ground potential, a ground electrode (not shown) may be further included between the first insulation layers 470, 470-1, and 470-2 in (a) to (d) of FIG. 14. Here, an additional insulation layer (not shown) may be further included between the ground electrode (not shown) and either the substrate 300 or the display module 200 on which the electrodes 450 and 460 are attached.

As described above, the touch input device 1000 according to the embodiment of the present invention senses the capacitance change occurring in the electrodes 450 and 460. Therefore, it is necessary for the driving signal to be applied to the drive electrode out of the first and second electrodes 450 and 460, and it is required to detect the touch pressure by the capacitance change amount by obtaining the sensing signal from the receiving electrode. According to the embodiment, it is possible to additionally include the touch sensing IC for the operation of the pressure detection module 400. In this case, the touch input device 1000 repeatedly has a configuration similar to the configuration of FIG. 1 including the drive unit 120, sensing unit 110, and controller 130, so that the area and volume of the touch input device 1000 increase.

According to the embodiment, the pressure detection module 400 applies the driving signal for the operation of the touch sensor panel 100 through the touch detection device and receives the sensing signal, so that the touch pressure can be detected. Hereafter, the following description will be provided by assuming that the first electrode 450 is the drive electrode and the second electrode 460 is the receiving electrode.

For this, in the touch input device 1000 according to the embodiment of the present invention, the driving signal may be applied to the first electrode 450 from the drive unit 120, and the second electrode 460 may transmit the sensing signal to the sensing unit 110. The controller 130 may perform the scanning of the touch sensor panel 100, and simultaneously perform the scanning of the pressure detection module 400, or the controller 130 performs the time-sharing, and then may generate a control signal such that the scanning of the touch sensor panel 100 is performed in a first time interval and the scanning of the pressure detection module 400 is performed in a second time interval different from the first time interval.

Therefore, in the embodiment of the present invention, the first electrode 450 and the second electrode 460 should be electrically connected to the drive unit 120 and/or the sensing unit 110. Here, it is common that the touch detection device for the touch sensor panel 100 corresponds to the touch sensing IC 150 and is formed on one end of the touch sensor panel 100 or on the same plane with the touch sensor panel 100. The pressure electrode patterns 450 and 460 may be electrically connected to the touch detection device of the touch sensor panel 100 by any method. For example, the pressure electrode patterns 450 and 460 may be connected to the touch detection device through a connector by using the second PCB 210 included in the display module 200. For example, as shown in FIG. 11, the conductive traces 451 and 461 which electrically extend from the first electrode 450 and the second electrode 460 respectively may be electrically connected to the touch sensing IC 150 through the second PCB 210, etc.

FIGS. 15a and 15b show an attachment method of the pressure electrode according the fourth embodiment of the present invention. FIGS. 15a and 15b show that the electrodes 450 and 460 according to the embodiment of the present invention are attached to the bottom surface of the display module 200. FIGS. 15a and 15b show the second PCB 210 on which a circuit for the operation of the display panel has been mounted is disposed on a portion of the bottom surface of the display module 200.

FIG. 15a shows that the pressure electrode patterns 450 and 460 are attached to the bottom surface of the display module 200 such that the first electrode 450 and the second electrode 460 are connected to one end of the second PCB 210 of the display module 200. Here, FIG. 15a shows that the first electrode 450 and the second electrode 460 are formed on the insulation layer 470. The first pressure electrode pattern 450 and the second pressure electrode pattern 460 is formed on the insulation layer 470 and may be attached as an integral sheet on the bottom surface of the display module 200. A conductive pattern may be printed on the second PCB 210 in such a manner as to electrically connect the pressure electrode patterns 450 and 460 to a necessary component like the touch sensing IC 150, etc. The detailed description of this will be provided with reference to FIGS. 16a to 16c.

FIG. 15b shows that the electrodes 450 and 460 are integrally formed on the second PCB 210 of the display module 200. For example, when the second PCB 210 of the display module 200 is manufactured, a certain area is separated from the second PCB, and then not only the circuit for the operation of the display panel but also the pattern corresponding to the first electrode 450 and the second electrode 460 can be printed on the area 211. A conductive pattern may be printed on the second PCB 210 in such a manner as to electrically connect the first electrode 450 and the second electrode 460 to a necessary component like the touch sensing IC 150, etc.

FIGS. 16*a* to 16*c* show how the pressure electrode is connected to the touch sensing IC 150 in accordance with the fourth embodiment of the present invention. In FIGS. 16*a* to 16*c*, the touch sensor panel 100 is included outside the display module 200. FIGS. 16*a* to 16*c* show that the touch detection device of the touch sensor panel 100 is integrated in the touch sensing IC 150 mounted on the first PCB 160 for the touch sensor panel 100.

FIG. 16*a* shows that the electrodes 450 and 460 attached to the display module 200 are connected to the touch sensing IC 150 through a first connector 121. As shown in FIG. 16*a*, in a mobile communication device such as a smart phone, the touch sensing IC 150 is connected to the second PCB 210 for the display module 200 through the first connector 121. The second PCB 210 may be electrically connected to the main board through a second connector 221. Therefore, through the first connector 121 and the second connector 221, the touch sensing IC 150 may transmit and receive a signal to and from the CPU or AP for the operation of the touch input device 1000.

Here, while FIG. 16*a* shows that the first electrode 450 is attached to the display module 200 by the method shown in FIG. 15*b*, the first electrode 450 can be attached to the display module 200 by the method shown in FIG. 15*a*. A conductive pattern may be printed on the second PCB 210 in such a manner as to electrically connect the first electrode 450 and the second electrode 460 to the touch sensing IC 150 through the first connector 121.

FIG. 16*b* shows that the electrodes 450 and 460 attached to the display module 200 are connected to the touch sensing IC 150 through a third connector 473. In FIG. 16*b*, the electrodes 450 and 460 may be connected to the main board for the operation of the touch input device 1000 through the third connector 473, and in the future, may be connected to the touch sensing IC 150 through the second connector 221 and the first connector 121. Here, the electrodes 450 and 460 may be printed on the additional PCB 211 separated from the second PCB 210. Otherwise, according to the embodiment, the pressure electrode patterns 450 and 460 may be formed on the insulation layer 470 and may be connected to the main board through the third connector 473 by extending the conductive trace, etc., from the electrodes 450 and 460.

FIG. 16*c* shows that the pressure electrode patterns 450 and 460 are directly connected to the touch sensing IC 150 through a fourth connector 474. In FIG. 16*c*, the electrodes 450 and 460 may be connected to the first PCB 160 through the fourth connector 474. A conductive pattern may be printed on the first PCB 160 in such a manner as to electrically connect the fourth connector 474 to the touch sensing IC 150. As a result, the electrodes 450 and 460 may be connected to the touch sensing IC 150 through the fourth connector 474. Here, the electrodes 450 and 460 may be printed on the additional PCB 211 separated from the second PCB 210. The second PCB 210 may be insulated from the additional PCB 211 so as not to be short-circuited with each other. Also, according to the embodiment, the electrodes 450 and 460 may be formed on the insulation layer 470 and may be connected to the first PCB 160 through the fourth connector 474 by extending the conductive trace, etc., from the electrodes 450 and 460.

The connection method of FIGS. 16*b* and 16*c* can be applied to the case where the electrodes 450 and 460 are formed on the substrate 300 as well as on the bottom surface of the display module 200.

FIGS. 16*a* to 16*c* have been described by assuming that a chip on board (COB) structure in which the touch sensing IC 150 is formed on the first PCB 160. However, this is just an example. The present invention can be applied to the chip on board (COB) structure in which the touch sensing IC 150 is mounted on the main board within the mounting space 310 of the touch input device 1000. It will be apparent to those skilled in the art from the descriptions of FIGS. 16*a* to 16*c* that the connection of the electrodes 450 and 460 through the connector can be also applied to another embodiment.

The foregoing has described the electrodes 450 and 460, that is to say, has described that the first electrode 450 constitutes one channel as the drive electrode and the second electrode 460 constitutes one channel as the receiving electrode. However, this is just an example. According to the embodiment, the drive electrode and the receiving electrode constitute a plurality of channels respectively, so that a plurality of pressure detection can be made based on the multi-touch.

FIGS. 17*a* to 17*c* show that the pressure electrode according to the embodiment of the present invention constitutes the plurality of channels. FIG. 17*a* shows the first electrode 450-1 and 450-2 and the second electrode 460-1 and 460-2 constitute two channels respectively. FIG. 17*b* shows that the first electrode 450 constitutes two channels 450-1 and 450-2 and the second electrode 460 constitutes one channel. FIG. 17*c* shows the first electrode 450-1 to 450-5 and the second electrode 460-1 to 460-5 constitute five channels respectively.

FIGS. 17*a* to 17*c* show that the pressure electrode constitutes a single or a plurality of channels. The pressure electrode may be comprised of a single or a plurality of channels by a variety of methods. While FIGS. 17*a* to 17*c* do not show that the electrodes 450 and 460 are electrically connected to the touch sensing IC 150, the electrodes 450 and 460 can be connected to the touch sensing IC 150 by the method shown in FIGS. 16*a* to 16*c* and other methods.

FIG. 18 is a graph that, when an experiment where the central portion of the touch surface of the touch input device 1000 according to the embodiment of the present invention is pressed by the non-conductive object is performed, represents a capacitance change amount according to a gram force of the object. As shown in FIG. 18, the greater the force which is applied to the central portion of the touch surface of the touch input device 1000 according to the embodiment of the present invention, the greater the capacitance change amount of the pressure electrode patterns 450 and 460 included in the pressure detection module 400.

The foregoing has described the capacitance type detection module as the pressure detection module 400. However, so long as the spacer layer 420 and the electrodes 450 and 460 are used as the pressure detection module 400, the touch input device 1000 according to the embodiment of the present is able to use any type pressure detection module.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

INDUSTRIAL APPLICABILITY

According to the embodiment of the present invention, it is possible to provide a touch sensor panel capable of sensing not only a touch on a surface of the touch sensor panel and a position of the touch but also a magnitude of a pressure of the touch, a touch detection device for the same, and a touch input device including the both.

Also, according to the embodiment of the present invention, it is possible to provide a touch sensor panel capable of sensing not only a touch on the touch sensor panel and a position of the touch but also a magnitude of a pressure of the touch by sensing capacitance change, a touch detection device for the same, and a touch input device including the both.

What is claimed is:

1. A touch input device comprising:
a display;
a substrate;
a first electrode located on a bottom surface of the display;
a second electrode located on a top surface of the substrate;
a spacer layer located between the first electrode and the second electrode; and
a support member disposed on at least one edge portion of the substrate;
wherein one of the first electrode and the second electrode is a drive electrode to which a drive signal is applied;
wherein the other one of the first electrode and the second electrode is a receiving electrode which receives the drive signal by a mutual capacitance between the first electrode and the second electrode;
wherein when an external pressure is applied to the first electrode through the display, the first electrode is concavely bent toward the second electrode in response to the external pressure;
wherein the mutual capacitance between the first electrode and the second electrode changes according to a distance between the first electrode and the second electrode;
wherein the magnitude of the external pressure is detected according to the change of the capacitance between the first electrode and the second electrode;
wherein the first electrode and the second electrode are overlapped with each other;
wherein the first electrode and the second electrode are spaced apart from each other by a predetermined distance; and
wherein when no external pressure is applied to the first electrode through the display, the predetermined distance is maintained only by the support member disposed on at least one edge portion of the substrate.

2. The touch input device of claim 1,
wherein one of the first electrode and the second electrode constitutes a single channel; and
wherein the other one of the first electrode and the second electrode constitutes a plurality of channels.

3. The touch input device of claim 1 wherein each of the first electrode and the second electrode constitutes a plurality of channels.

4. The touch input device of claim 1 wherein each of the first electrode and the second electrode constitutes a single channel.

5. The touch input device of claim 1,
wherein the drive electrode comprises N number of electrodes; and
wherein the drive signal is applied to a plurality of electrodes among the N number of electrodes at the same time.

6. The touch input device of claim 1,
further comprising a touch sensor for detecting a touch position;
wherein the drive signal is applied to the drive electrode within a time interval during which a drive signal is applied to the touch sensor.

7. The touch input device of claim 1,
further comprising a touch sensor for detecting a touch position;
wherein the drive signal is applied to the drive electrode in a first time interval and a drive signal is applied to the touch sensor in a second time interval different from the first time interval.

8. A touch input device comprising:
a display;
at least one electrode located on a bottom surface of the display;
a substrate located opposite to the display;
a spacer layer located between the at least one electrode and the substrate; and
a support member disposed on at least one edge portion of the substrate;
wherein the at least one electrode and the substrate are overlapped with each other;
wherein the at least one electrode and the substrate are spaced apart from each other by a predetermined distance;
wherein when no external pressure is applied to the at least one electrode through the display, the predetermined distance is maintained only by the support member disposed on at least one edge portion of the substrate;
wherein when an external pressure is applied to the at least one electrode through the display, the at least one electrode is concavely bent toward the substrate in response to the external pressure;
wherein the capacitance between the at least one electrode and the substrate changes according to a distance between the at least one electrode and the substrate; and
wherein the magnitude of the external pressure is detected according to the change of the capacitance between the at least one electrode and the substrate.

9. The touch input device of claim 8,
further comprising at least one insulation layer;
wherein the at least one electrode is formed on the at least one insulation layer, and is attached as an integral sheet on a surface of the display.

10. The touch input device of claim 8 wherein the at least one electrode is directly formed on a surface of the display.

11. The touch input device of claim 8 wherein the at least one electrode is integrally formed with a surface of the display.

12. The touch input device of claim 8 wherein the at least one electrode is printed on a surface of the display.

13. The touch input device of claim 8 wherein the at least one electrode is patterned on a surface of the display.

14. The touch input device of claim 8 wherein the at least one electrode constitutes a plurality of channels.

15. The touch input device of claim 8 wherein the at least one electrode constitutes a single channel.

16. The touch input device of claim 8,
wherein the at least one electrode comprises N number of electrodes; and
wherein a drive signal is applied to a plurality of electrodes among the N number of electrodes at the same time.

17. The touch input device of claim 8,
further comprising a touch sensor for detecting a touch position;
wherein a drive signal is applied to the at least one electrode within a time interval during which a drive signal is applied to the touch sensor.

18. The touch input device of claim 8,
further comprising a touch sensor for detecting a touch position;
wherein a drive signal is applied to the at least one electrode in a first time interval and a drive signal is applied to the touch sensor in a second time interval different from the first time interval.

19. The touch input device of claim 8 wherein the spacer layer is air.

20. The touch input device of claim 8 wherein the spacer layer is foam, gel or polymer.

21. A touch input device comprising:
a display;
a substrate;
at least one electrode located on a top surface of the substrate;
a spacer layer located between the at least one electrode and the display; and
a support member disposed on at least one edge portion of the substrate;
wherein the at least one electrode and the display are overlapped with each other;
wherein the at least one electrode and the display are spaced apart from each other by a predetermined distance;
wherein when no external pressure is applied to the display, the predetermined distance is maintained only by the support member disposed on at least one edge portion of the substrate;
wherein when an external pressure is applied to the display, the display is concavely bent toward the at least one electrode in response to the external pressure;
wherein the capacitance between the at least one electrode and the display changes according to a distance between the at least one electrode and the display; and
wherein the magnitude of the external pressure is detected according to the change of the capacitance between the at least one electrode and the display.

22. The touch input device of claim 21,
further comprising a second insulation layer, a fourth insulation layer, and a substrate located on one side of the at least one electrode opposite to the display;
wherein the at least one electrode is disposed on one side of the second insulation layer, and the fourth insulation layer is disposed on one side of the at least one electrode opposite to the second insulation layer, and the at least one electrode is attached as an integral sheet on a surface of the substrate.

23. The touch input device of claim 21 wherein the at least one electrode constitutes a plurality of channels.

24. The touch input device of claim 21 wherein the at least one electrode constitutes a single channel.

25. The touch input device of claim 21,
wherein the at least one electrode comprises N number of electrodes; and
wherein a drive signal is applied to a plurality of electrodes among the N number of electrodes at the same time.

26. The touch input device of claim 21,
further comprising a touch sensor for detecting a touch position;
wherein a drive signal is applied to the at least one electrode within a time interval during which a drive signal is applied to the touch sensor.

27. The touch input device of claim 21,
further comprising a touch sensor for detecting a touch position;
wherein a drive signal is applied to the at least one electrode in a first time interval and a drive signal is applied to the touch sensor in a second time interval different from the first time interval.

28. The touch input device of claim 21 wherein the spacer layer is air.

29. The touch input device of claim 21 wherein the spacer layer is foam, gel or polymer.

* * * * *